(12) United States Patent
Takahashi

(10) Patent No.: US 7,489,853 B2
(45) Date of Patent: Feb. 10, 2009

(54) AUXILIARY INFORMATION GENERATION METHOD, AUXILIARY INFORMATION GENERATION APPARATUS, VIDEO DATA GENERATION METHOD, VIDEO DATA PLAYBACK METHOD, VIDEO DATA PLAYBACK APPARATUS, AND DATA STORAGE MEDIUM

(75) Inventor: Toshiya Takahashi, Osaka (JP)

(73) Assignee: Panasonic Corporation, Osaka (JP)

( * ) Notice: Subject to any disclaimer, the term of this patent is extended or adjusted under 35 U.S.C. 154(b) by 1189 days.

(21) Appl. No.: 09/940,629

(22) Filed: Aug. 29, 2001

(65) Prior Publication Data

US 2002/0041757 A1    Apr. 11, 2002

(30) Foreign Application Priority Data

Aug. 29, 2000   (JP)   ............... 2000-258652

(51) Int. Cl.
H04N 5/76   (2006.01)
H04N 7/00   (2006.01)
H04N 5/00   (2006.01)

(52) U.S. Cl. ........................... 386/95; 386/117
(58) Field of Classification Search ............ 348/231.99, 348/231.3, 231.4; 386/1, 95, 117
See application file for complete search history.

(56) References Cited

U.S. PATENT DOCUMENTS

| | | | |
|---|---|---|---|
| 5,187,511 A * | 2/1993 | Amano | 396/319 |
| 5,493,647 A * | 2/1996 | Miyasaka et al. | 714/42 |
| 5,515,101 A * | 5/1996 | Yoshida | 348/239 |
| 5,561,531 A * | 10/1996 | Funazaki | 386/95 |
| 5,903,309 A * | 5/1999 | Anderson | 348/333.02 |
| 6,449,422 B1 * | 9/2002 | Ebisawa | 386/52 |
| 6,538,698 B1 * | 3/2003 | Anderson | 348/333.05 |
| 6,614,988 B1 * | 9/2003 | Sampsell | 388/95 |
| 6,629,104 B1 * | 9/2003 | Parulski et al. | 707/102 |
| 6,686,970 B1 * | 2/2004 | Windle | 348/584 |
| 6,757,081 B1 * | 6/2004 | Fan et al. | 358/474 |
| 6,788,346 B2 * | 9/2004 | Ito et al. | 348/372 |
| 2004/0208482 A1 * | 10/2004 | Suga et al. | 386/95 |
| 2005/0053352 A1 * | 3/2005 | McKain et al. | 386/46 |

OTHER PUBLICATIONS

ISO/IEC JTC1/SC29/WG11/N3411, "MPEG-7 Multimedia Description Schemes WD (Version 3.0)", Peter Van Beek et al., Geneva, May 3, 2000.

* cited by examiner

Primary Examiner—Thai Tran
Assistant Examiner—Gelek Topgyal
(74) Attorney, Agent, or Firm—Wenderoth, Lind & Ponack, L.L.P.

(57) ABSTRACT

Auxiliary information relating to digital data such as video and audio data is generated in synchronization with power-on, or generated according to an instruction from the user operating an information button or the like. Further, only an important portion of digital data is extracted by using the auxiliary information to generate reduced digital data, whereby the time and cost required for transmission is reduced.

9 Claims, 44 Drawing Sheets

Fig.3

```xml
<?xml version="1.0" encoding="UTF-8"?>
<!DOCTYPE Mpeg7Main SYSTEM "MPEG7_Contents.dtd">
<Mpeg7Main id="V16" version="Travel">
<VideoSebment Id="Program">
    <MediaInformation>                    ⎯ 301a
        <MediaProfile>
            <MediaFormat>
                <FileFormat>MPEG-4 Video</FileFormat>
            </MediaFormat>
            <MediaInstance>
                <Identifier IdOrganization="MPEG" IdName="ContentSet">
                    <IdValue>Travel1</IdValue>
                </Identifier>
            </MediaInstance>
        </MediaProfile>              ⎯ 301b
    </MediaInformation>                                        ⎯ 302
    <SegmentDecomposition DecompositionType="temporal">
        <VideoSegment id="Seg0">    ⎯ 303a
            <CreationMetaInformation>
                <Creation>
                    <Title type="original">    ⎯ 304
                        <TitleText xml:lang="us_en">Start</TitleText>
                    </Title>
                </Creation>
            </CreationMetaInformation>              ⎯ 305a
            <PointOfView ViewPoint="son">
                <Value>0.2</Value>    ⎯ 306
            </PointOfView>                               ⎯ 305b
            <PointOfView ViewPoint="daughter">
                <Value>0.6</Value>
            </PointOfView>
            <PointOfView ViewPoint="exciting">
                <Value>0.1</Value>
            </PointOfView>
            <MediaTime>
                <MediaTimePoint>T00:00:00:0F30</MediaTimePoint>
                <MediaDuration>PT1M19S0N30F</MediaDuration>
            </MediaTime>              ⎯ 303b
        </VideoSegment>
        <VideoSegment id="Seg1">
            <CreationMetaInformation>
                <Creation>
                    <Title type="original">
                        <TitleText xml:lang="us_en">Playland</TitleText>
                    </Title>
                </Creation>
            </CreationMetaInformation>
            <PointOfView ViewPoint="CAPTION">
                <Value>1.0</Value>
            </PointOfView>
            <PointOfView ViewPoint="son">
                <Value>0.6</Value>
            </PointOfView>
            <PointOfView ViewPoint="daughter">
                <Value>0.6</Value>
            </PointOfView>
            <PointOfView ViewPoint="exciting">
                <Value>0.8</Value>
            </PointOfView>
            <MediaTime>
                <MediaTimePoint>T00:01:19:0F30</MediaTimePoint>
                <MediaDuration>PT8M40S0N30F</MediaDuration>
            </MediaTime>
        </VideoSegment>
            ⋮
```

Degree of importance is low

Degree of importance is high

Degree of importance is low

Degree of importance is high

Fig.50 Prior Art

```
<VideoSegment id="VS1">
   <MediaTime>
      <MediaTimePoint> <h>0</h> <m>0</m> <s>0</s> </MediaTimePoint>
      <MediaDuration> <m>10</m> </MediaDuration>
   </MediaTime>
   <MediaTimeMask NumberOfIntervals="2">
      <MediaTime>
         <MediaTimePoint> <h>0</h> <m>0</m> <s>0</s> </MediaTimePoint>
         <MediaDuration> <m>6</m> </MediaDuration>
      </MediaTime>
      <MediaTime>
         <MediaTimePoint> <h>0</h> <m>7</m> <s>0</s> </MediaTimePoint>
         <MediaDuration> <m>3</m> </MediaDuration>
      </MediaTime>
   </MediaTimeMask>

<GoFGoPHistogramD HistogramTypeInfo="Average">
   <!_Value of GoFGoPHistogram D -->
   </GoFGoPHistogramD>
   <SegmentDecomposition Gap = "true" Overlap = "true"
             DecompositionType = "temporal">
      <VideoSegment id="VS2">
         <MediaTime>
            <MediaTimePoint> <h>0</h> <m>0</m> <s>0</s>
                                       </MediaTimePoint>
            <MediaDuration> <m>5</m> </MediaDuration>
         </MediaTime>
         <GoFGoPHistogramD HistogramTypeInfo="Average">
         </GoFGoPHistogramD>
      </VideoSegment>
      <VideoSegment id="VS4">
         <MediaTime>
            <MediaTimePoint> <h>0</h> <m>0</m> <s>0</s>
                                       </MediaTimePoint>
            <MediaDuration> <m>6</m> </MediaDuration>
         </MediaTime>
         <GoFGoPHistogramD HistogramTypeInfo="Average">
         </GoFGoPHistogramD>

</VideoSegment>
   </SegmentDecomposition>
</VideoSegment>
```

Fig.51 Prior Art
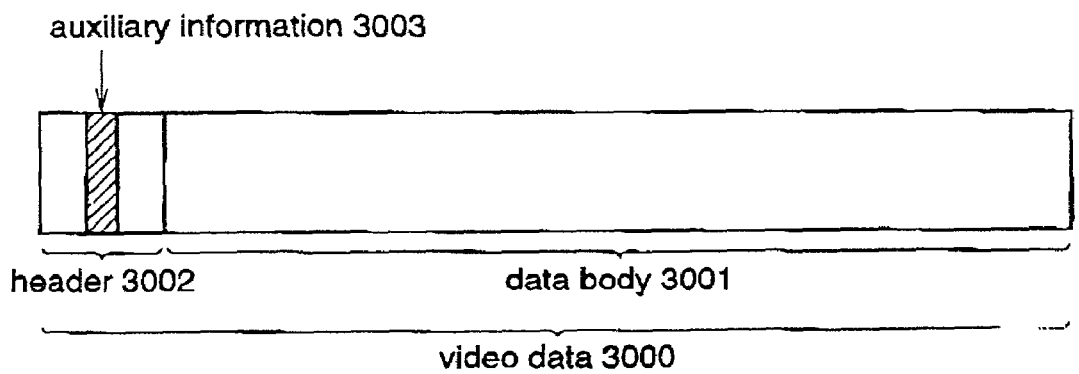
Prior Art
Fig.52 (a)
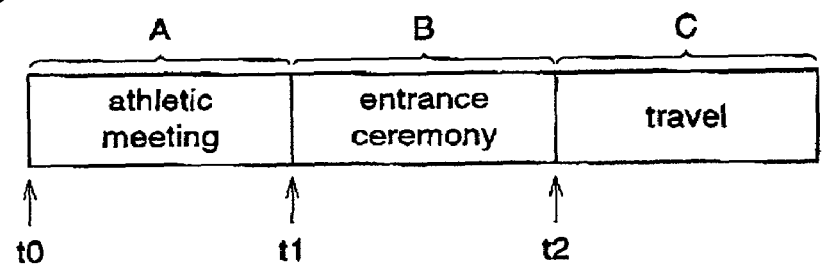
Fig.52 (b)
Fig.52 (c)
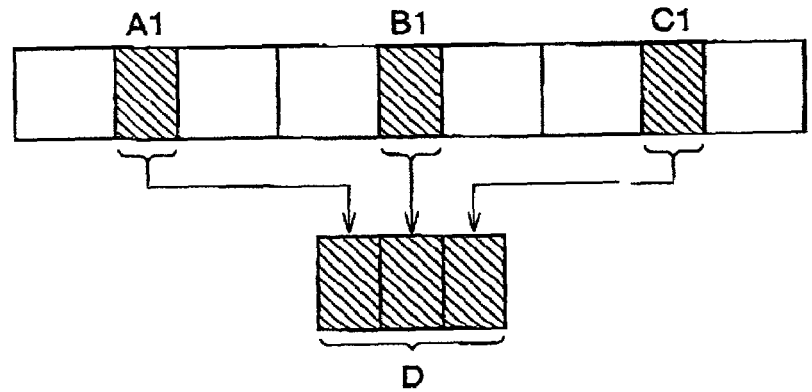

AUXILIARY INFORMATION GENERATION METHOD, AUXILIARY INFORMATION GENERATION APPARATUS, VIDEO DATA GENERATION METHOD, VIDEO DATA PLAYBACK METHOD, VIDEO DATA PLAYBACK APPARATUS, AND DATA STORAGE MEDIUM

BACKGROUND OF THE INVENTION

1. Field of the Invention

The present invention relates to an auxiliary information generation method, an auxiliary information generation apparatus, an image data generation method, and a data storage medium. More particularly, the invention relates to a method and an apparatus for generating auxiliary information which is used as index information when extracting or selecting a part of digital data such as digital video and audio data, and a method for generating partial video data by extracting a desired portion of image data by utilizing the auxiliary information, as well as a method and an apparatus for playing the partial video. Further, the invention relates to a data storage medium which stores a program for making a computer execute the auxiliary information generation method and the video data generation method, and data generated as the result of executing these methods.

2. Description of the Related Art

In recent years, with the progress in digitization of video and audio, standardization of video and audio data compression methods such as MPEG-2 and MPEG-4 has been achieved for the purpose of improving efficiency in recording or transmission and, furthermore, standardization relating to description of auxiliary information, which is used when selecting desired data from a database holding these video and audio data or extracting a portion of the video data, has been promoted as MPEG-7.

Hereinafter, an example of description of auxiliary information relating to digital data based on MPEG-7 will be described with reference to drawings (ISO/IEC JTC 1/SC 29/WG 11/N3411, "MPEG-7 Multimedia Description Schemes WD (Version 3.0)", 2000.5).

As for viewing of video and audio data, it has been common practice that contents of video and audio data produced by a producer are broadcast and viewed by many people. However, as mobile devices such as personal computers and handy phones have become widespread, these mobile devices have permitted the users to interactively operate video and audio data through the Internet or the like, as well as to view these data one-sidedly. Accordingly, it is expected that service patterns, which enable the users to retrieve only a desired portion of contents from databases scattered on the Internet without viewing all of the contents, or enable the providers to select contents according to preferences of the users and distribute the contents to the users, will become widespread in the future. MPEG-7 is an international standard, which is now under standardization, for describing temporal information, contents, preferences of users, and the like with respect to multimedia data such as video and audio.

FIG. 50 shows an example of description based on MPEG-7 (excerpt from ISO/IEC JTC 1/SC 29/WG 11/N3410, "MPEG-7 Multimedia Description Schemes XM (Version 3.0)", 2000.5). In this example, a portion of video data is described by a description of VideoSegment, and the VideoSegment corresponds to one scene. Auxiliary information is described by using MediaTimePoint indicating the start time of this segment, MediaDuration indicating the duration of this segment, and SegmentDecomposition indicating the presence or absence of a gap between segments, and the like. As shown in FIG. 51, this auxiliary information 3003 is added to a header 3002 or the like of video data 3000, whereby the user can easily search for or extract desired data such as video data. In FIG. 51, 3001 denotes a data body corresponding to the video data 3000 excluding the header 1002.

In MPEG-7, however, only the description itself of the auxiliary information relating to contents information is standardized, and a method for generating the auxiliary information is not defined. Further, there is no definition about what kind of information is to be provided using MPEG-7.

Meanwhile, with respect to mobile devices such as handy phones which have rapidly become widespread or progressed in functions, it is expected that those provided with capturing functions such as cameras or movies will become inexpensive in the future. In this case, a captured (moving) picture can be transmitted to a destination through a mobile communication network. On the other hand, the telephone charge on such video communication is not necessarily a fixed charge such as a month-by-month basis. In the case of mobile terminals, a pay-per-view basis according to the amount of transmitted/received data is usually employed. Therefore, if the whole of a captured (moving) picture is transmitted as it is, the communication cost will become high.

SUMMARY OF THE INVENTION

The present invention is made to solve the above-described problems and has for its object to provide a method and an apparatus for generating auxiliary information relating to digital data, a method for generating video data, which can reduce the cost of transmitting a picture from a mobile terminal, a method and an apparatus for playing a part of video data having a high degree of importance, and a data storage medium which holds a program for executing these methods as well as data obtained as the result of executing these methods.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an auxiliary information generation method which includes, generating auxiliary information relating to digital data when the digital data is generated, and recording or transmitting the generated auxiliary information together with the digital data. Therefore, auxiliary information can be easily generated at a desired generation timing which is not defined in the standard.

According to a second aspect of the present invention, in the auxiliary information generation method of the first aspect, a candidate of auxiliary information to be generated is selected, and auxiliary information corresponding to the selected candidate is generated. Therefore, auxiliary information can be easily generated at a desired generation timing which is not defined in the standard.

According to a third aspect of the present invention, in the auxiliary information generation method of the first aspect, generation of the auxiliary information is carried out in synchronization with the start or completion of any one of inputting, recording, or transmission of the digital data. Therefore, auxiliary information can be easily generated at a desired generation timing which is not defined in the standard.

According to a fourth aspect of the present invention, in the auxiliary information generation method of the first aspect, generation of the auxiliary information is carried out with, as a trigger, user operation performed on a data generation apparatus which generates the digital data. Therefore, auxiliary information can be generated at a desired generation timing which is not defined in the standard.

According to a fifth aspect of the present invention, in the auxiliary information generation method of the first aspect, the digital data is video and audio data, and the auxiliary information includes any of temporal information, contents, and degree of importance of the video and audio data. Therefore, any of temporal information, title, and degree of importance, which are useful as indexes, can be used as auxiliary information which is information for searching video and audio data.

According to a sixth aspect of the present invention, there is provided an auxiliary information generation apparatus for generating auxiliary information relating to digital data when the digital data is generated, and recording or transmitting the digital data and the auxiliary information. Therefore, auxiliary information can be easily generated at a desired generation timing which is not defined in the standard.

According to a seventh aspect of the present invention, the auxiliary information generation apparatus of the sixth aspect comprises a CPU which is included in a data generation apparatus for generating the digital data. Therefore, auxiliary information can be easily generated at the end of the data generation apparatus which generates digital data.

According to an eighth aspect of the present invention, in the auxiliary information generation apparatus of the seventh aspect, wherein the data generation apparatus includes a display means for displaying the digital data, and the CPU includes: a menu display means for displaying, on the display means, a menu of auxiliary information which is to be selected by the user of the data generation apparatus; a model selection means for selecting a model of auxiliary information according to options in the menu selected by the user; and a model rewriting means for rewriting parameter sections in the selected model according to an instruction from the user. Therefore, the user can generate auxiliary information according to a menu display, resulting in a user-friendly auxiliary information generation apparatus.

According to a ninth aspect of the present invention, there is provided a video data generation method which includes reducing the length of digital data including video on the basis of auxiliary information relating to the digital data, thereby generating reduced digital data, and recording or transmitting the reduced digital data. Therefore, reduced digital data can be generated considering not only the auxiliary information but also the time required for transmission or the capacity required for recording, and important video data can be generated using the generated auxiliary information, whereby the communication cost and the capacity required for recording are reduced.

According to a tenth aspect of the present invention, in the video data generation method of the ninth aspect, the reduced digital data is generated by preferentially extracting digital data having a high degree of importance, on the basis of the auxiliary information. Therefore, it is possible for a producer of data to generate reduced digital data comprising only important segments selected by the producer.

According to an eleventh aspect of the present invention, in the video data generation method of the tenth aspect, generation of the reduced digital data is carried out on the basis of the time required for transmission of the digital data or the storage capacity required for recording of the digital data, in addition to the auxiliary information, and the generated reduced digital data is transmitted. Therefore, only a portion of original data having a high degree of importance can be transmitted to a destination.

According to a twelfth aspect of the present invention, in the video data generation method of the tenth aspect, the generated reduced digital data is reproduced at the side where the digital data is generated. Therefore, only a portion of original data having a high degree of importance can be reproduced at the end where the digital data is generated.

According to a thirteenth aspect of the present invention, there is provided a video data generation method which includes reducing the length of digital data including video on the basis of auxiliary information relating to the digital data, and information relating to transmission, thereby generating reduced digital data, and recording or transmitting the reduced digital data. Therefore, reduced digital data can be generated considering not only the auxiliary information but also the information relating to transmission, and important video data can be generated using the generated auxiliary information, whereby the communication cost and the capacity required for recording are reduced.

According to a fourteenth aspect of the present invention, in the video data generation method of the thirteenth aspect, the information relating to transmission is information about the name of a destination. Therefore, reduced digital data can be generated considering not only the auxiliary information but also the information relating to the name of the destination.

According to a fifteenth aspect of the present invention, in the video data generation method of the thirteenth aspect, the information relating to transmission is information about the contents to be transmitted. Therefore, reduced digital data can be generated considering not only the auxiliary information but also the information relating to the contents to be transmitted.

According to a sixteenth aspect of the present invention, in the video data generation method of the thirteenth aspect, the information relating to transmission is information about the capability of a terminal at a destination. Therefore, reduced digital data can be generated considering not only the auxiliary information but also the information about the capability of the terminal at the destination.

According to a seventeenth aspect of the present invention, there is provided a video data generation method which includes selecting at least one piece of digital data from a plurality of pieces of digital data including video, on the basis of auxiliary information relating to the digital data and information relating to transmission, and recording or transmitting the selected digital data. Therefore, at least one piece of digital data can be selected from a plurality of pieces of digital data according to the auxiliary information and the information relating to transmission to a destination, and the selected data can be transmitted to a destination. Thus, important video data is generated using the generated auxiliary information, whereby the communication cost and the capacity required for recording can be reduced.

According to an eighteenth aspect of the present information, in the video data generation method of the seventeenth aspect, the information relating to transmission is information about the name of a destination. Therefore, at least one piece of digital data can be selected from a plurality of pieces of digital data according to the auxiliary information and the information about the name of the destination, and the selected data can be transmitted to the destination.

According to a nineteenth aspect of the present invention, in the video data generation method of the seventeenth aspect, the information relating to transmission is information about the contents to be transmitted. Therefore, at least one piece of digital data can be selected from a plurality of pieces of digital data according to the auxiliary information and the information about the contents to be transmitted, and the selected data can be transmitted to the destination.

According to a twentieth aspect of the present invention, in the video data generation method of the seventeenth aspect, the information relating to transmission is information about the capability of a terminal at a destination. Therefore, at least one piece of digital data can be selected from a plurality of pieces of digital data according to the auxiliary information and the information about the capability of the terminal at the destination, and the selected data can be transmitted to the destination.

According to a twenty-first aspect of the present invention, there is provided a video data playback method which includes reducing the length of digital data including video, on the basis of auxiliary information relating to the digital data, thereby generating reduced digital data, and displaying the reduced digital data. Therefore, only a portion of the original data having a high degree of importance can be played at the end where the digital data is generated, and the time required for the playback can be reduced.

According to a twenty-second aspect of the present invention, there is provided a video data playback apparatus for reducing the length of digital data including video, on the basis of auxiliary information relating to the digital data, thereby generating reduced digital data; and displaying the reduced digital data. Therefore, only a portion of the original data having a high degree of importance can be played at the end where the digital data is generated, and the time required for the playback can be reduced.

According to a twenty-third aspect of the present invention, there is provided a data storage medium which stores a data processing program for making a computer execute the auxiliary information generation method according to the first aspect. By using this recording medium, generation of auxiliary information can be carried out with a computer.

According to a twenty-fourth aspect of the present invention, there is provided a data storage medium which stores a data processing program for making a computer execute the video data generation method according to the thirteenth aspect. By using this recording medium, generation of reduced video data smaller than the original data can be carried out with a computer.

According to a twenty-fifth aspect of the present invention, there is provided a data storage medium which stores a data processing program for making a computer execute the video data generation method according to the seventeenth aspect. By using this recording medium, a process of generating video data by selecting at least one piece of data from the original data, can be carried out with a computer.

According to a twenty-sixth aspect of the present invention, there is provided a data storage medium which stores the auxiliary information generated by the auxiliary information generation method according to a first aspect. Therefore, generation of auxiliary information can be carried out with a computer and, furthermore, the auxiliary information can be stored separately from the original data.

According to a twenty-seventh aspect of the present invention, there is provided a data storage medium which stores the video data generated by the video data generation method according to the thirteenth aspect. Therefore, selection of important video data from the original video data can be carried out with a computer, and the selected video data can be stored separately from the original video data.

According to a twenty-eighth aspect of the present invention, there is provided a data storage medium which stores the video data generated by the video data generation method according to the seventeenth aspect. Therefore, selection of important video data from the original video data can be carried out with a computer, and the selected video data can be stored separately from the original video data.

BRIEF DESCRIPTION OF THE DRAWINGS

FIG. 3 is a diagram for explaining an example of auxiliary information which is generated by the auxiliary information generator according to the first embodiment.

FIG. 50 is a diagram illustrating an example of description of picture data according to the prior art.

FIG. 51 is a diagram illustrating a section where auxiliary information is to be inserted in picture data.

FIG. 52 is a diagram illustrating a method of using auxiliary information.

DETAILED DESCRIPTION OF THE INVENTION

Embodiment 1

Hereinafter, an auxiliary information generation method according to a first embodiment of the present invention will be described with reference to the drawings.

In advance of describing the auxiliary information generation method, a method of using auxiliary information will be described with reference to FIGS. 52(a)-52(c). As shown in FIG. 52(a), scene A of athletic meeting, scene B of entrance ceremony, and scene C of travel are successively recorded as video data on the same recording medium.

Amongst these video data, hatched parts A1, B1, and C1 in FIG. 52(b) are given high values of importance as auxiliary information.

From the scenes A (athletic meeting), B (entrance ceremony), and C (travel), only the parts A1, B1, and C1 which are given high values of importance as auxiliary information are extracted and combined to form an extracted scene D, and the extracted scene D is stored or transmitted, whereby only the scenes of high degrees of importance can be efficiently recorded or transmitted as compared with the case where all of the captured scenes of athletic meeting, entrance ceremony, and travel are stored or transmitted as they are. This results in a reduced amount of use in the recording medium and reduced communication costs. The extraction of the scenes of high degrees of importance may be carried out during or after the capturing of scenes A, B, C.

Further, with respect to music data, since the contents of the music data can be easily expressed by adding data indicating one phrase of the music as auxiliary information, searching for the music data is facilitated.

Figure 1:
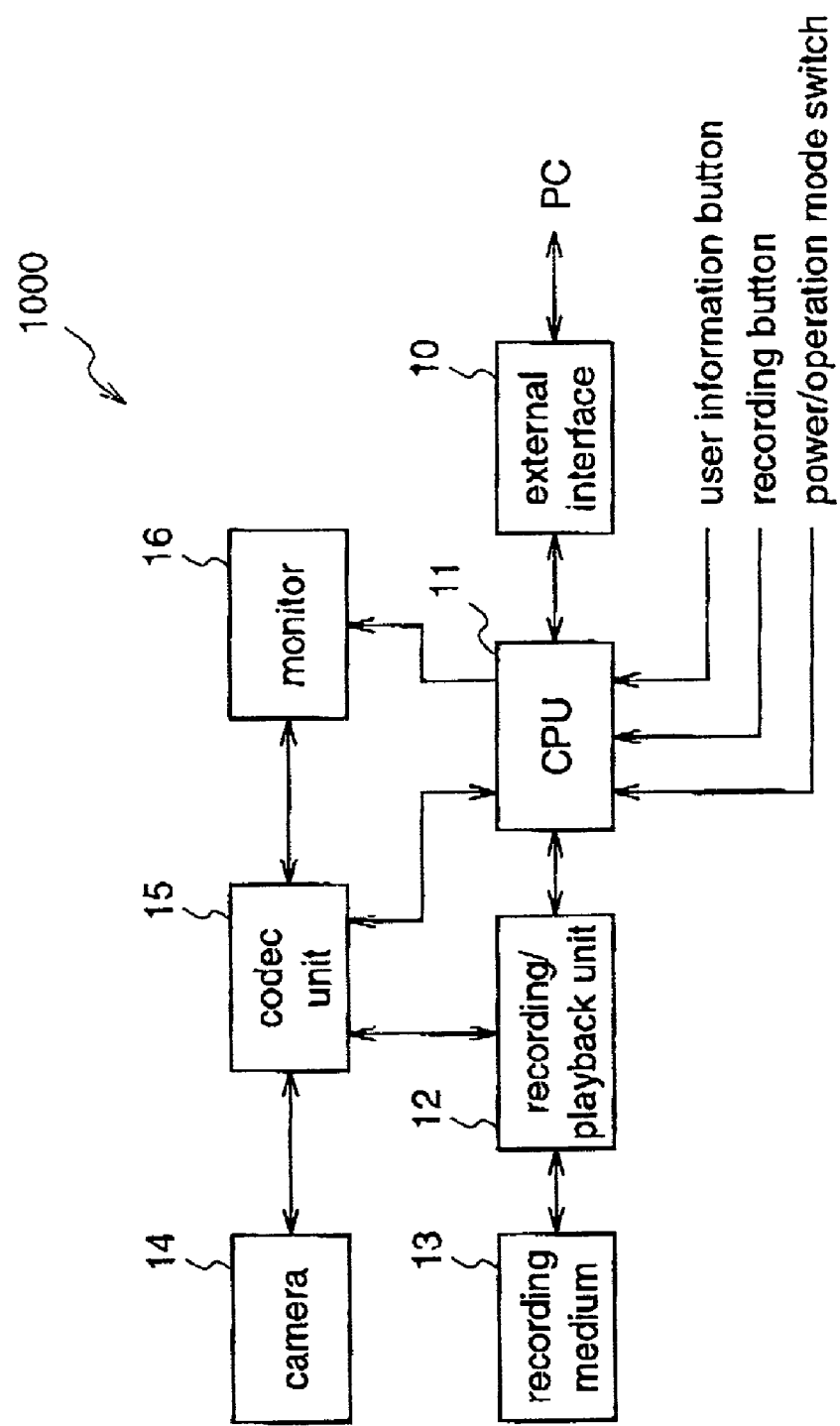
FIG. 1 is a block diagram illustrating a combined camera and digital VTR having an auxiliary information generator according to a first embodiment of the present invention.

FIG. 1 is a block diagram illustrating a video recording/playback apparatus comprising a combined camera and digital VTR 1000, which includes an auxiliary information generation apparatus according to the first embodiment of the present invention.

In FIG. 1, reference numeral 11 denotes a CPU as a controller; 12 denotes a recording/playback unit for recording or reproducing data in/from a recording medium 13 such as a video cassette, an optical disk, a magnetic disk, a memory card, or the like; 13 denotes a recording medium on which multimedia data such as video data and audio data are recorded; 14 denotes a camera for capturing a picture, subjecting the picture to light-to-electricity conversion, and converting a sound at capturing into an audio signal; 15 denotes a codec unit for performing interface between the camera and a monitor, and compressing or decompressing input video and audio data; 16 denotes a motor unit for playing back the scene during recording or the video after recording, such as a liquid crystal monitor or an electronic or liquid crystal viewfinder; and 10 denotes an external interface for exchanging data between this video recording/playback apparatus and an external device such as a PC or the like.

Figure 2:
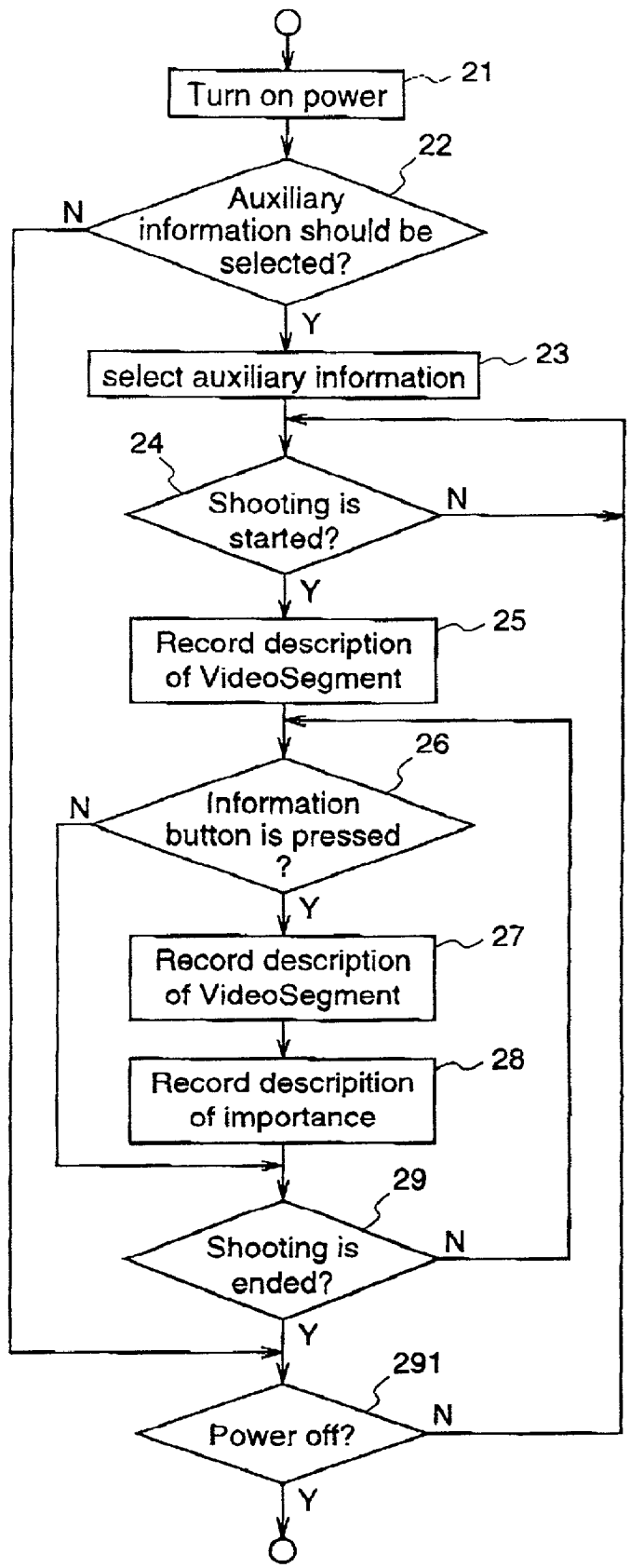
FIG. 2 is a flowchart for explaining the operation of a CPU 11 when generating auxiliary information, according to the first embodiment.

FIG. 2 is a flowchart illustrating an example of operation when the CPU 11 generates auxiliary information, and FIG. 3 is a diagram for explaining an example of auxiliary information generated by the auxiliary information generation apparatus.

Further, FIGS. 4(a) and 4(b) are schematic diagrams illustrating a combined camera and digital VTR as an example of the video recording/playback apparatus.

In the combined camera and digital VTR, after a power/operation mode switch (power switch) 105 is turned on, a recording button (capturing switch) 104 is turned on, whereby the CPU 11 shown in FIG. 1 puts the combined camera and digital VTR into recording mode. A picture of a subject, which is formed by a lens 100 of the camera 14, is converted into a video signal by a light-to-electricity conversion unit (not shown) such as a CCD included in the combined camera and digital VTR, and a sound at capturing is converted into an audio signal by an internal microphone 102. These video signal and audio signal are encoded by the codec unit 15 shown in FIG. 1, and converted into a format for recording by the recording/playback unit 12, and thereafter, recorded on the recording medium 13 such as a video cassette tape, an optical disk, or the like. During the recording, the video signal output through the codec unit 15 is displayed by the monitor 103 (i.e., an electronic or liquid crystal viewfinder 101 or a monitor 103 such as a liquid crystal monitor, which are incorporated in the combined camera and digital VTR), whereby the user can confirm whether a picture is actually recorded or not, and what is the recorded picture like.

After capturing a desired picture, when the user operates the power/operation mode switch (operation mode switch) 105, the CPU 11 puts the combined camera and digital VTR into fast-rewind mode, and detects the recording start position on the recording medium. Thereafter, when the user operates the power/operation mode switch (operation mode switch) 105, the CPU 11 puts the combined camera and digital VTR into playback mode. Thereby, the recording/playback unit 12 reads the video data of the shot picture from the recording medium 13, the codec unit 15 decodes the video signal, and the monitor 103 plays the video. Thereby, the combined camera and digital VTR performs playback with the monitor 103, and the user can enjoy the captured picture with the screen of the monitor 103 which is wider than the viewfinder 101. Further, the user can easily confirm whether the desire picture has been shot or not, or search for a point of time where auxiliary information is to be input, or conform whether scenes extracted from the video data on the basis of the auxiliary information are as intended or not. When the extracted scenes are not as intended, the user can easily perform an editing operation such as re-inputting of the auxiliary information.

Furthermore, reference numeral 108 denotes a battery pack for driving the combined camera and digital VTR; 107 denotes a cassette lid which covers a portion where a video cassette tape is mounted on the combined camera and digital VTR; 106 denotes a grip belt which supports a hand of the user holding the VTR at capturing; and 109 denotes an information button for inputting auxiliary information.

Figure 4:
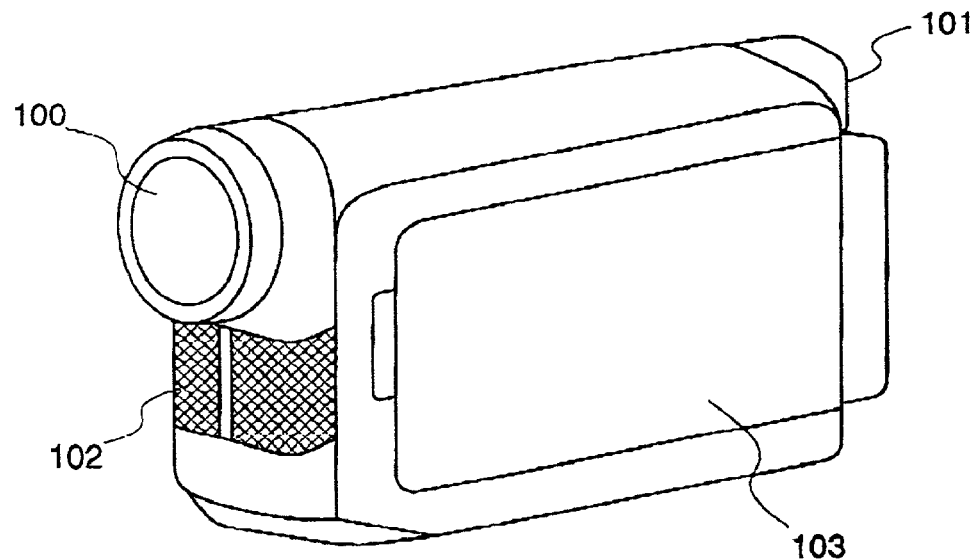
FIG. 4 is a schematic diagram illustrating a combined camera and digital VTR as an example of an image recording/playback apparatus.
Figure 4:
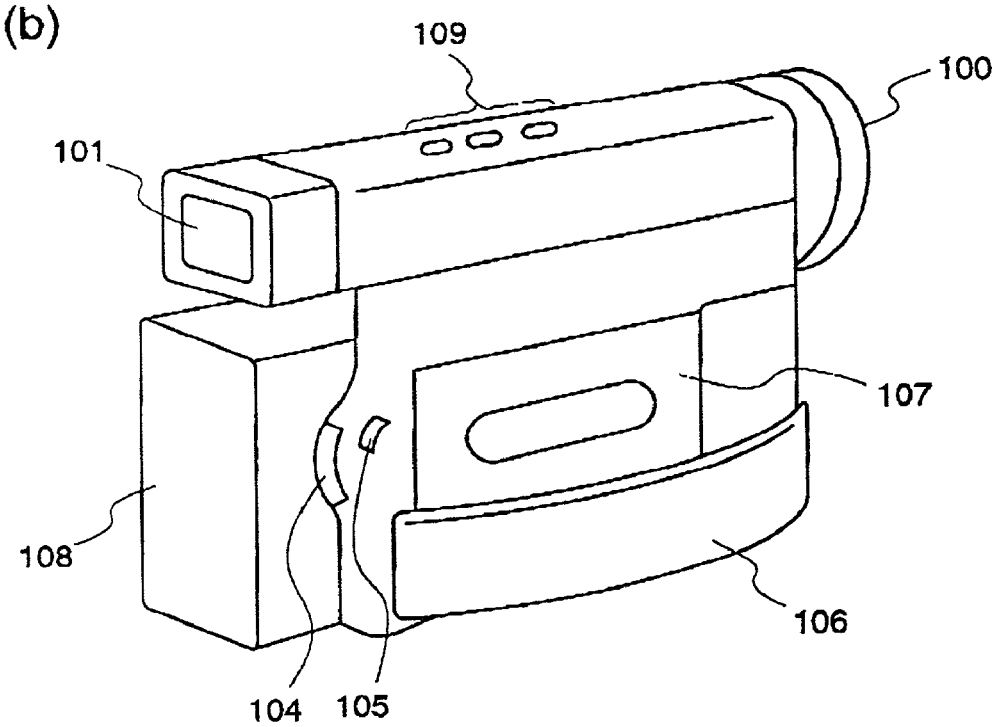

Although it is not shown in FIG. 4, the played video can be displayed on an external wider monitor which is connected to the combined camera and digital VTR through the external interface 10 shown in FIG. 1, or the video data recorded on the recording medium can be transmitted to a personal computer through the external interface 10 to be edited on the personal computer.

Hereinafter, an auxiliary information generation method will be described taking, as an example, the video recording/playback apparatus having the auxiliary information generation apparatus constructed as described above, with reference to FIGS. 1, 2, and 3.

The combined camera and digital VTR having the auxiliary information generation apparatus shown in FIG. 1 has a construction similar to that of an ordinary combined camera and digital VTR, as shown in FIG. 4. In the combined camera and digital VTR, a picture captured by the camera 13 is monitored by the monitor 16 and, simultaneously, it is compressed by the codec unit 15, and recorded on the recording medium 13 through the recording/playback unit 12.

This combined camera and digital VTR is different from the conventional one only in the operation of the CPU 11, and the CPU 11 can generate auxiliary information on the basis of control signals which are supplied from the user information button 109, the capturing switch 104, and the power switch 105. That is, the CPU 11 corresponds to the auxiliary information generation apparatus.

Figure 5:
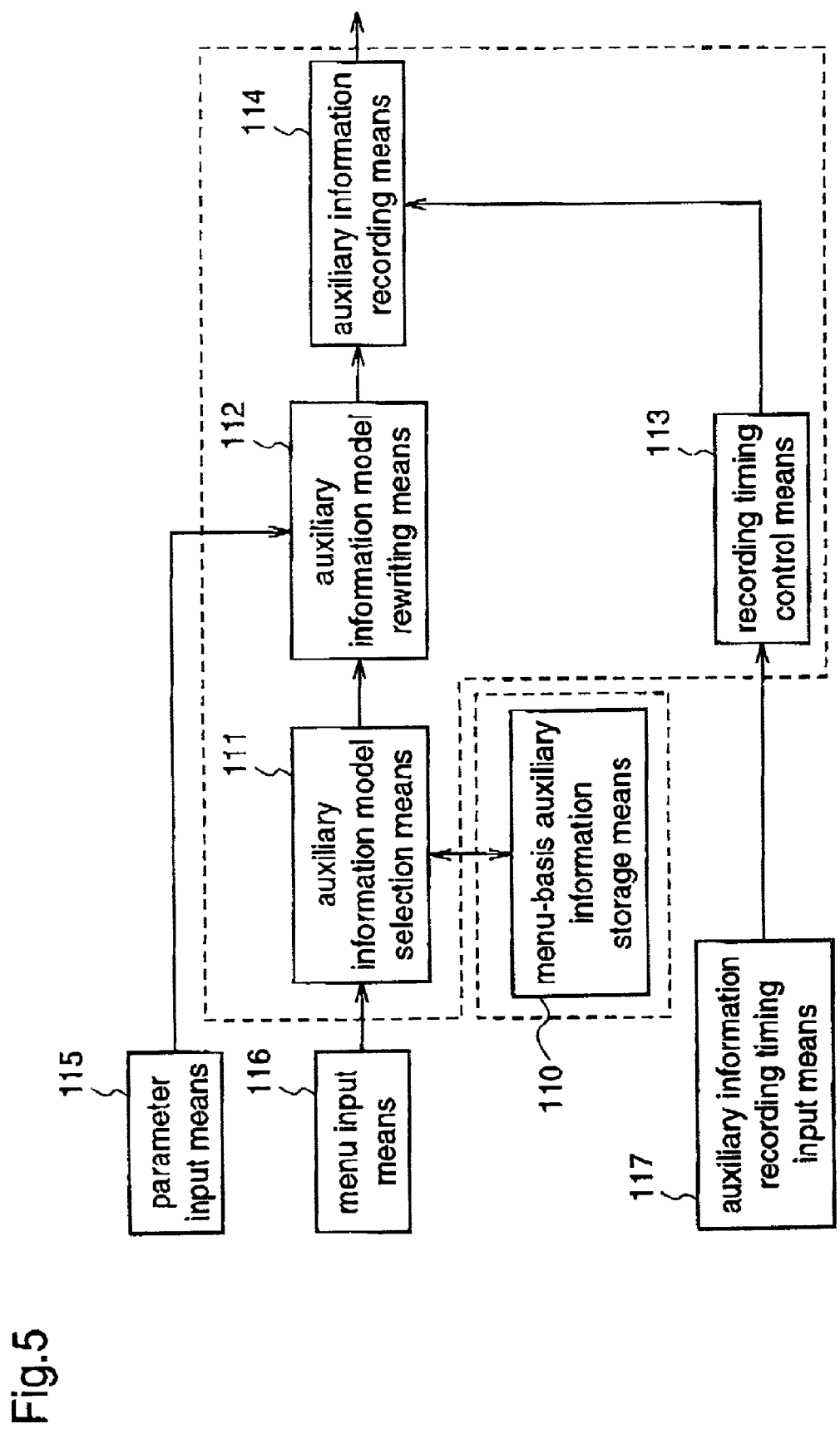
FIG. 5 is a block diagram illustrating an auxiliary information generator implemented by the CPU 11.

FIG. 5 is a block diagram illustrating the construction of the auxiliary information generation apparatus implemented by the CPU 11. In FIG. 5, reference numeral 110 denotes a menu-basis auxiliary information storage means which stores a plurality of models of auxiliary information corresponding to different menus; 111 denotes an auxiliary information model selection means for selecting one of the auxiliary information models stored in the menu-basis auxiliary information storage means 110, according to an instruction from a menu input means 116; 112 denotes an auxiliary information model rewriting means for rewriting the auxiliary information model selected by the auxiliary information model selection means 111, according to parameters supplied from a parameter input means 115; 113 denotes a recording timing control means for controlling the timing of recording the auxiliary information, according to an input from an auxiliary information recording timing input means 117; 114 denotes an auxiliary information storage means for writing the auxiliary information model which has been rewritten by the auxiliary information model rewriting means 112, into the recording medium, under control of the recording timing control means 113.

The auxiliary information model selection means 111, the auxiliary information model rewriting means 112, the recording timing control means 113, and the auxiliary information recording means 114 are parts implemented by the CPU 11 itself, the menu-basis auxiliary information storage means 110 is a part implemented by a ROM (not shown) included in the CPU 11, and the parameter input means 115, the menu input means 116, and the auxiliary information recording timing input means 117 are parts implemented by the user information buttons 109, the recording button 104 as the capturing switch, the power/operation mode switch 105 as the power switch, and the like.

FIG. 2 shows the operation of the CPU 11 when generating auxiliary information relating to digital data. It is assumed that the CPU 11 operates even in the stand-by state where the power/operation mode switch 105 of the combined camera and digital VTR is OFF.

Initially, when the user turns on the power/operation mode switch 105 of the combined camera and digital VTR (step 21), the CPU 11 is notified that the power is turned on. Thereby, it is set by default that auxiliary information is to be input.

Next, whether the type of auxiliary information to be generated should be selected or not is input by combination of the operations of the switches such as the recording button 104, the power/operation mode switch 105, and the like (step 22).

Figure 6:
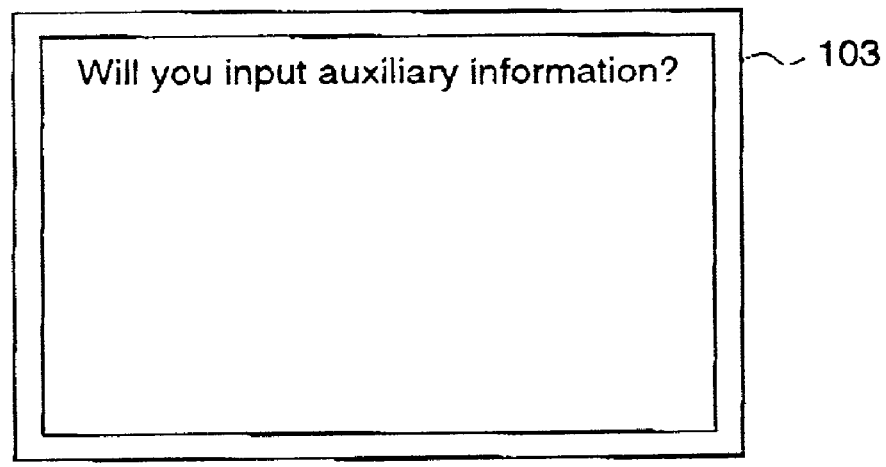
FIG. 6 is a diagram illustrating a question displayed according to the menu method.
Figure 7:
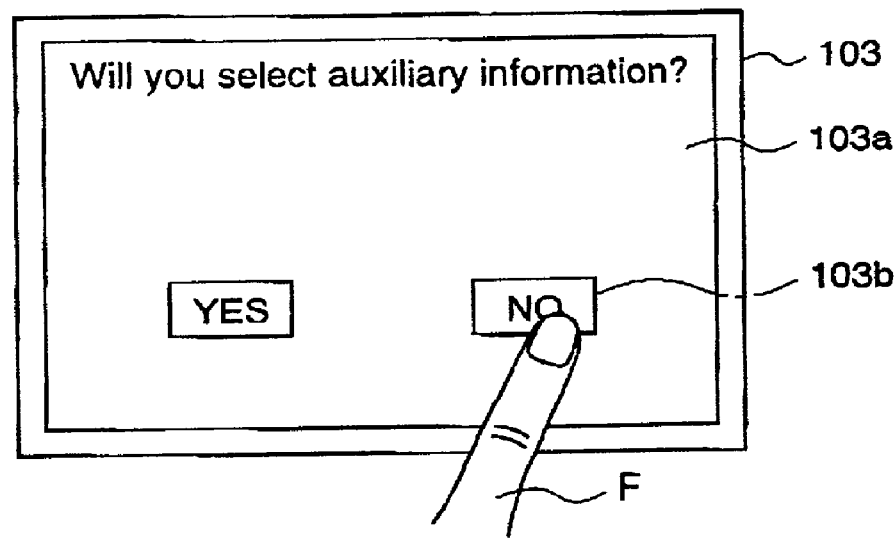
FIG. 7 is a diagram illustrating a displayed question and a way for answering the question, according to the menu method.

This selection may be performed by a menu method, that is, by making a question to the user with a menu displayed on the monitor 103. To be specific, the CPU 11 outputs a question to the monitor 16 as shown in FIG. 6. When a touch panel 103a is provided as shown in FIG. 7, the CPU 11 outputs answer buttons 103b to the question, and displays the answer buttons on the monitor 16. At this time, the CPU 11 searches the ROM which stores the question. Instead of inputting the auxiliary information by default, a question to the user may be made by the menu method to obtain an answer to the question from the user.

Figure 8:
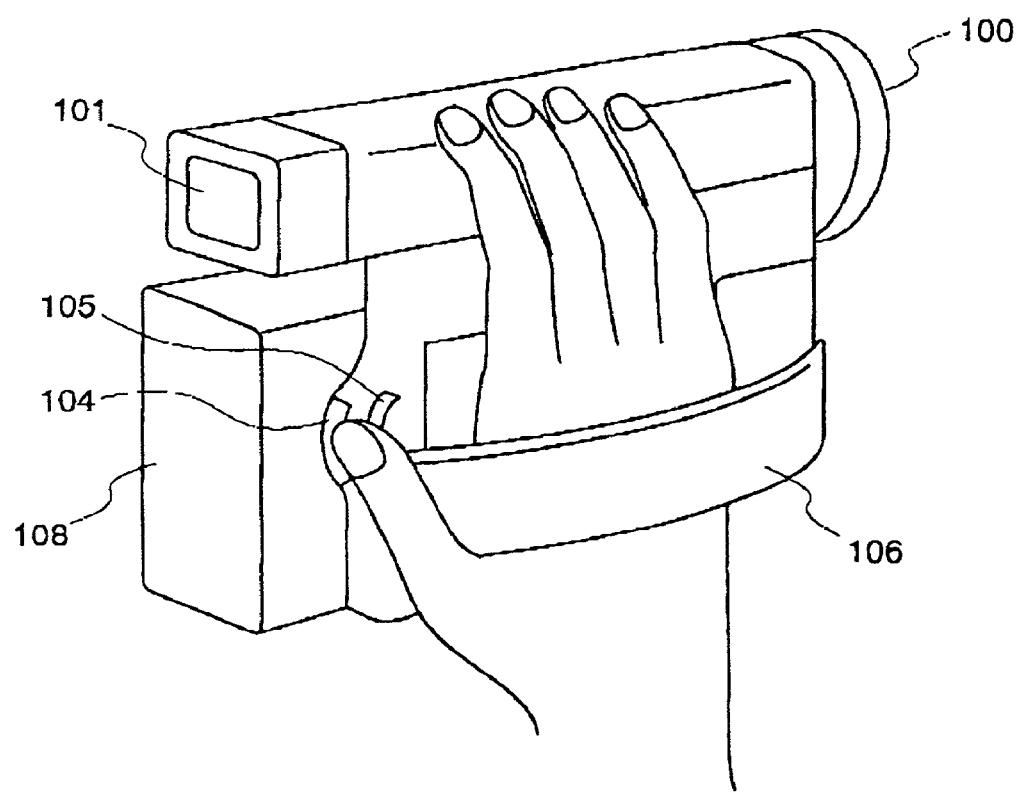
FIG. 8 is a diagram illustrating another way for answering the question according to the menu method.
Figure 9:
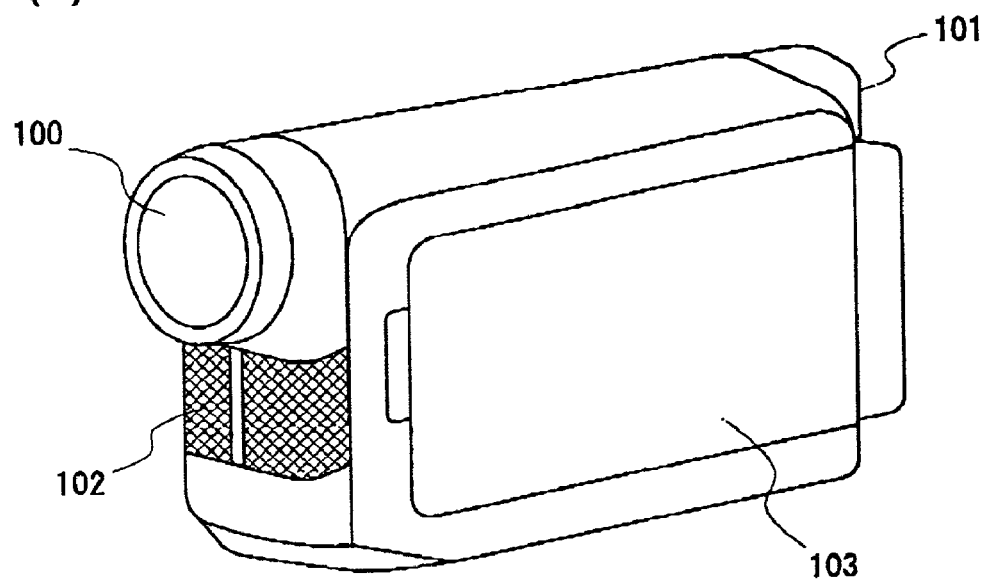
FIG. 9 is a diagram illustrating an information switch provided on the upper surface of the body of the combined camera and digital VTR.
Figure 9:
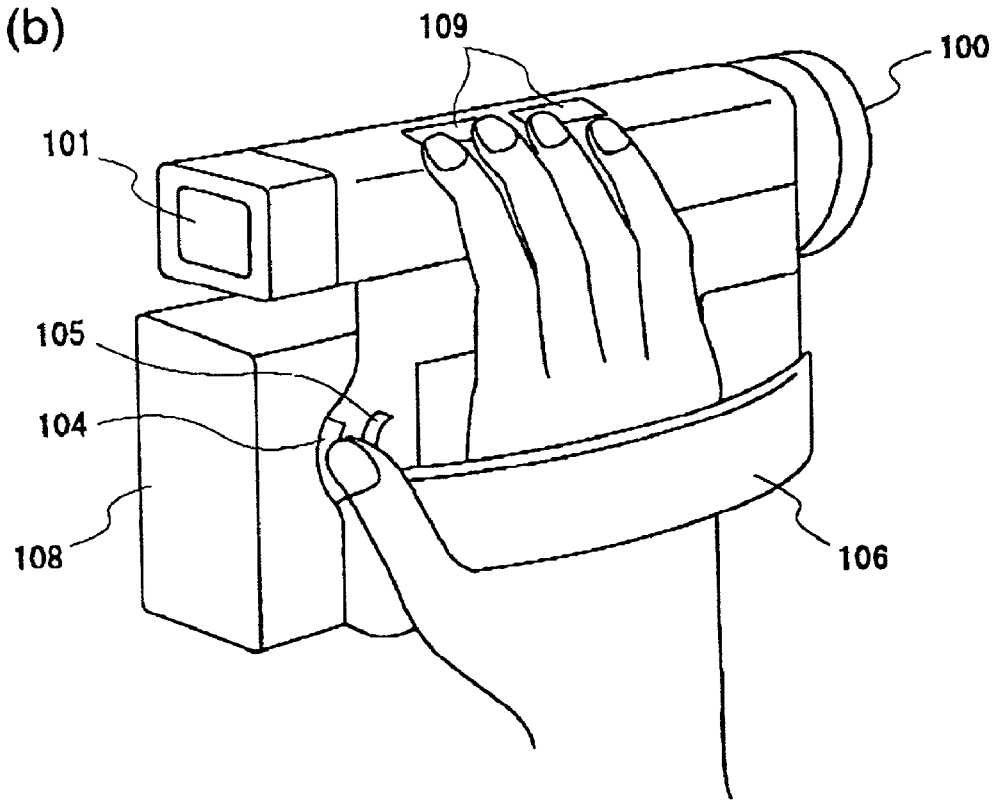
Figure 10:
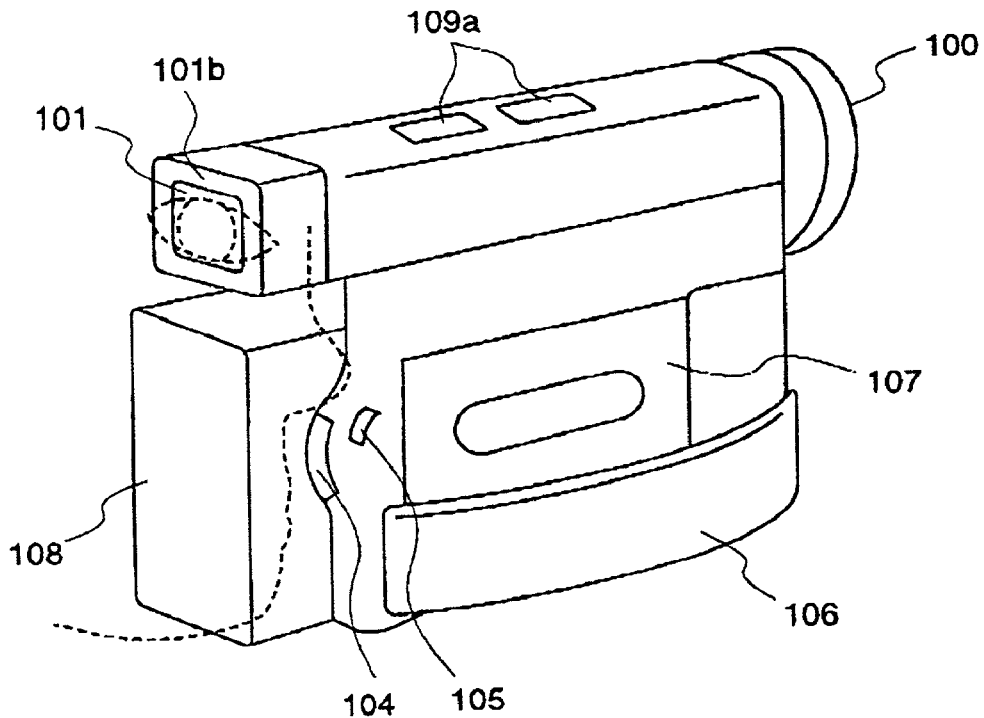
FIG. 10 is a diagram illustrating a pressure sensor provided on the upper surface of the body of the combined camera and digital VTR.
Figure 11:
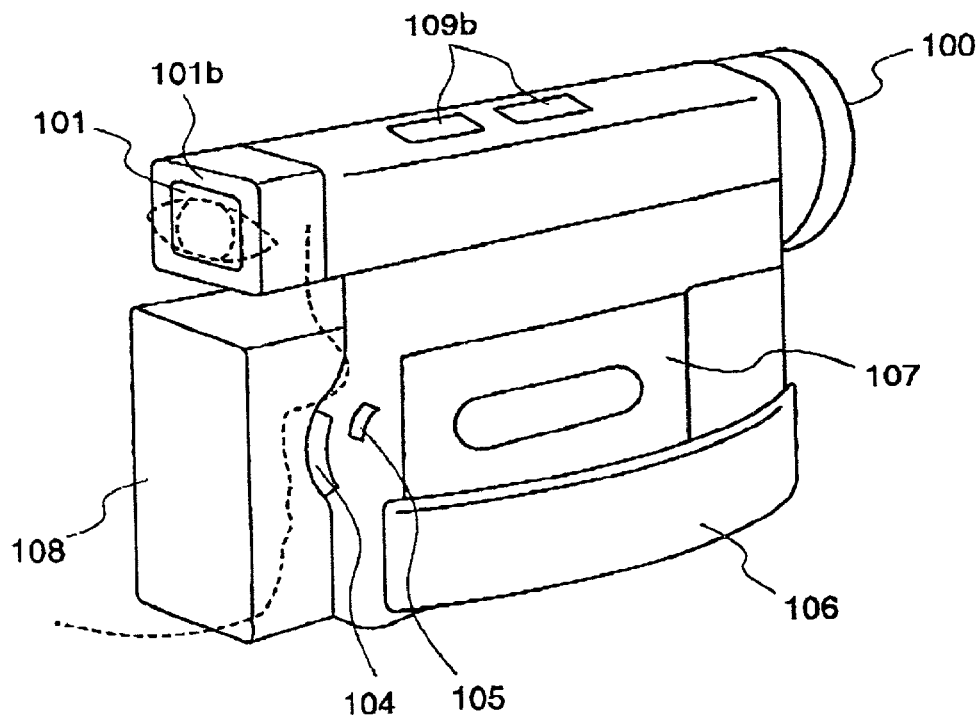
FIG. 11 is a diagram illustrating a sweat sensor provided on the upper surface of the body of the combined camera and digital VTR.
Figure 12:
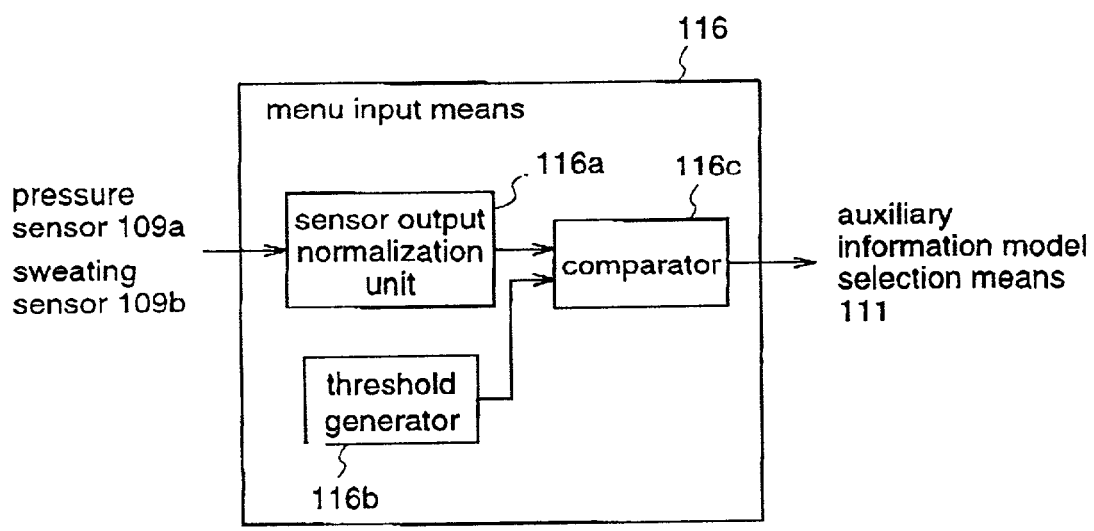
FIG. 12 is a block diagram illustrating an example of a menu input means.

The user answers the question as follows. That is, as shown in FIG. 8, the user selects a menu button by performing, with his/her thumb, a combination of switching operations of the recording button 104, the power/operation mode switch 105, and the like, which are provided on the rear right side of the body of the combined camera and digital VTR, by a predetermined number of times, in a predetermined order. Alternatively, as shown in FIGS. 9, 10, and 11, an information switch 109, a pressure sensor 109a, and a sweat sensor 109b may be provided on the upper surface of the body, and the user may select a menu button by pressing it with the fingers of the hand that grips the combined camera and digital VTR. When using a sensor, as shown in FIG. 12, it is necessary to normalize the sensor output by a sensor output normalization unit 116a, compare the normalized sensor output with a threshold which is generated by a threshold generation unit 116b, by a comparator 116c, and then output the comparison result to the auxiliary information pattern selection means 112.

Figure 13:
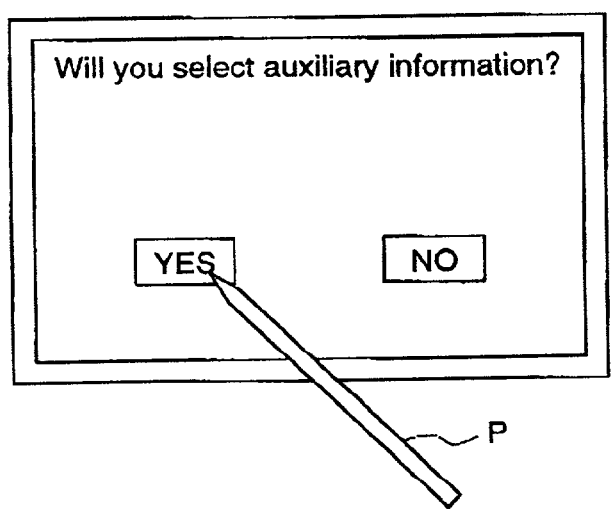
FIG. 13 is a diagram illustrating another example of an answer input according to the menu method.
Figure 14:
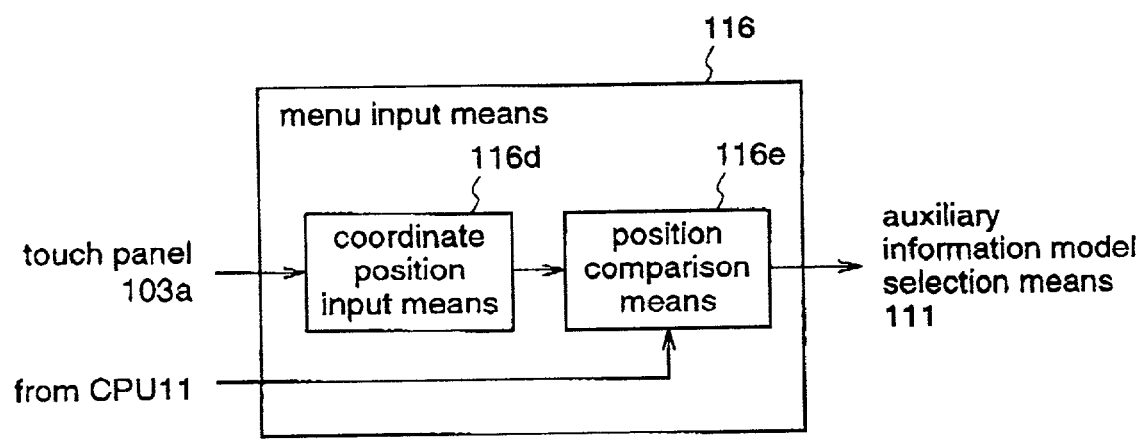
FIG. 14 is a block diagram illustrating another example of a menu input means.
Figure 15:
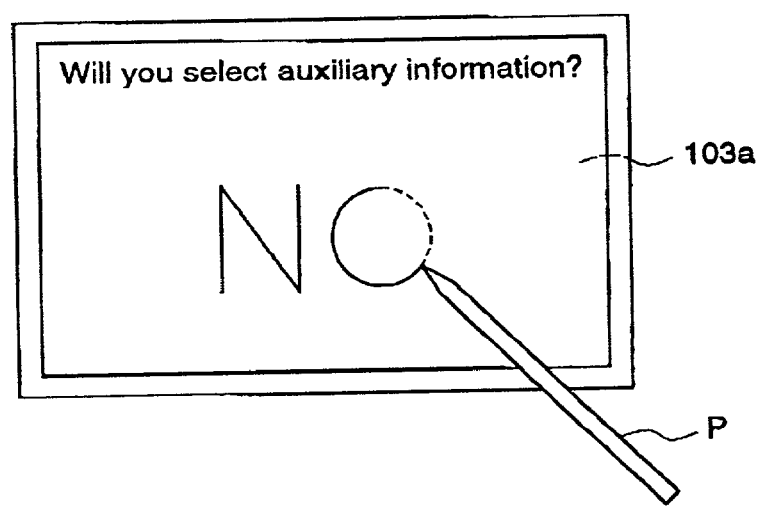
FIG. 15 is a diagram illustrating another example of an answer input according to the menu method.
Figure 16:
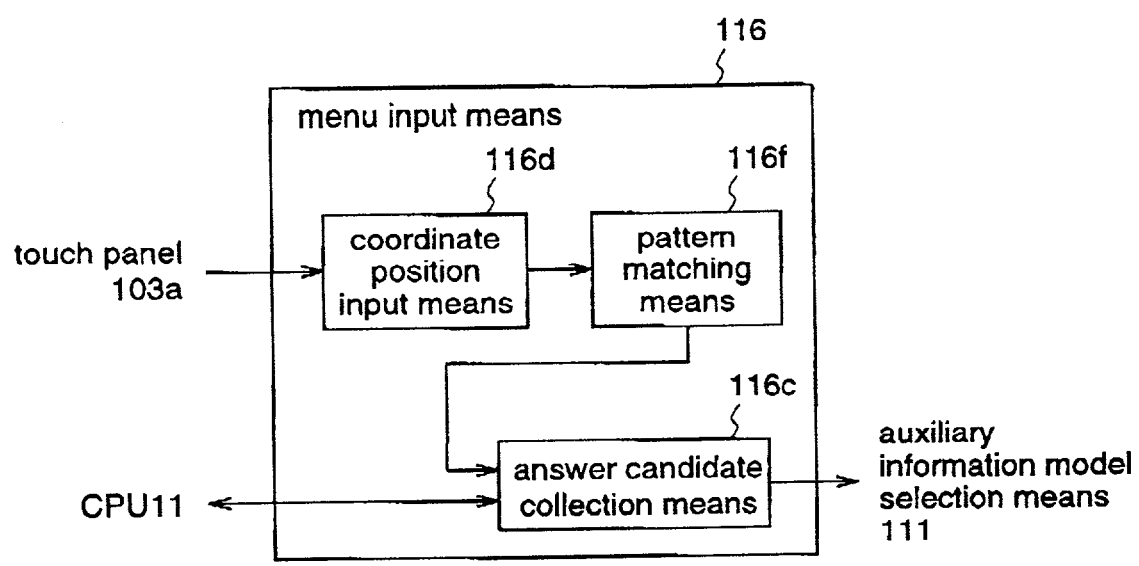
FIG. 16 is a block diagram illustrating another example of a menu input means.

Furthermore, when the liquid phase monitor 103 is provided with a touch panel 103a as shown in FIG. 7, the user may select an answer by putting a finger F on an option button 103b displayed on the liquid crystal monitor. Further, as shown in FIG. 13, the user may select an answer by applying a pen P such as a plastic pen to the touch panel. In these cases, as shown in FIG. 14, within the menu input means 116, the coordinates of the portion on the panel which is pressed by the finger F or the pen P are supplied from the touch panel 103a to a coordinate position input means 116d, and a position comparison means 116e compares the coordinates with the positions where the option buttons 103b are displayed, which positions are supplied from the CPU 11, whereby the selected option button is informed to the auxiliary information model selection means 111. Further, as shown in FIG. 15, a selected option may be input by hand-writing an answer to the question with a pen on the touch panel 103a, and automatically recognizing this answer. In this case, as shown in FIG. 16, the coordinates of the portion on the touch panel 103b, which portion is pressed by the finger F or the pen P, are supplied from the touch panel 103a to the coordinate position input means 116d. Then, a pattern matching means 116f recognizes the hand-written character string according to a standard character pattern which is similar to the input characters as a trail of points pressed by the finger or pen. Then, an answer candidate collation means 116g collates the candidates of answers to the question, which candidates are issued from the CPU 11, with the recognized character string to judge whether the answer is appropriate or not. When the answer is appropriate, the answer is output to the auxiliary information model selection means 111.

Figure 17:
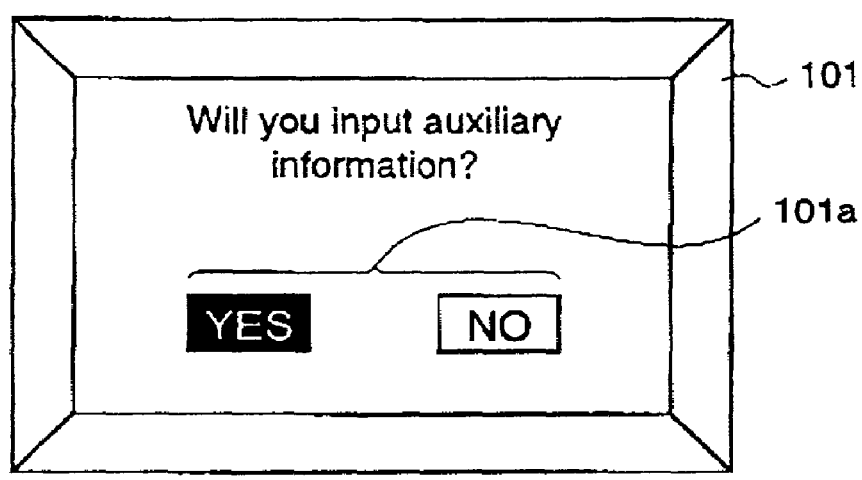
FIG. 17 is a diagram illustrating another example of an answer input according to the menu method.
Figure 17:
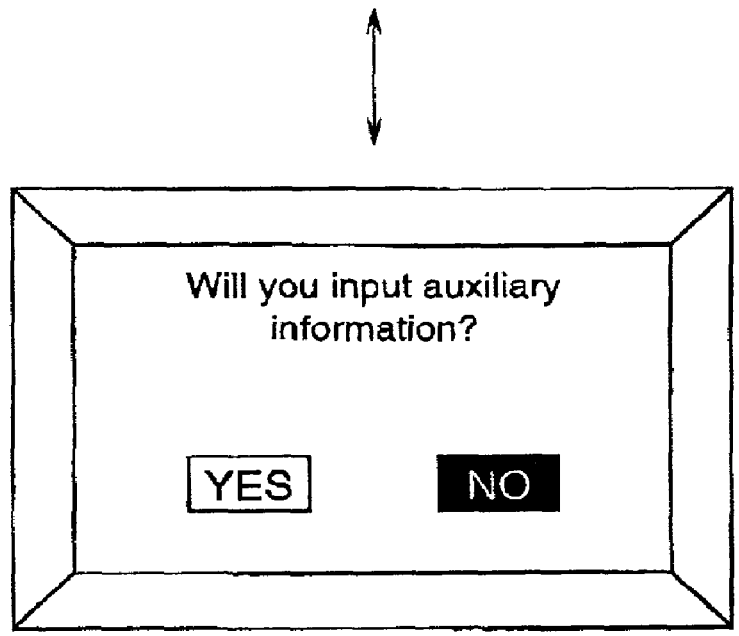
Figure 18:
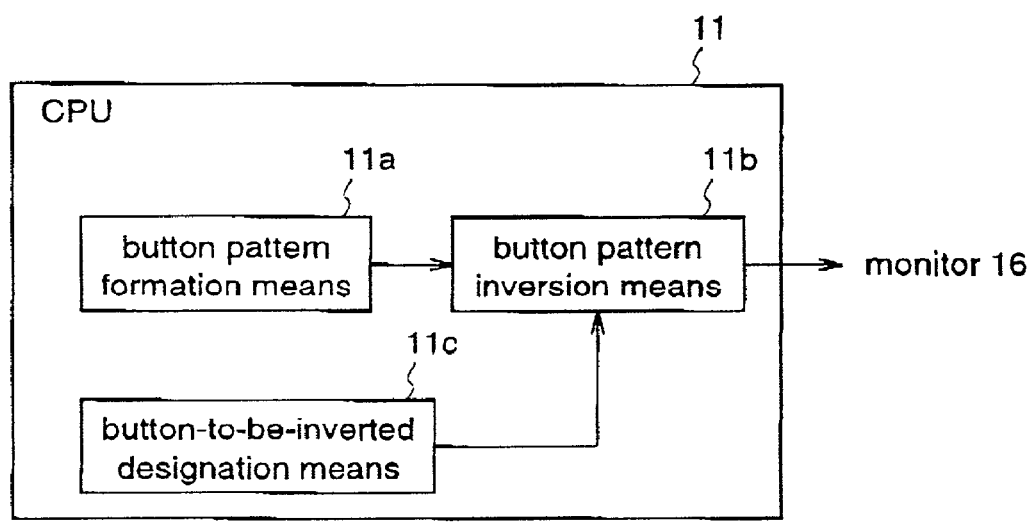
FIG. 18 is a block diagram illustrating a CPU having a button pattern moving means.
Figure 19:
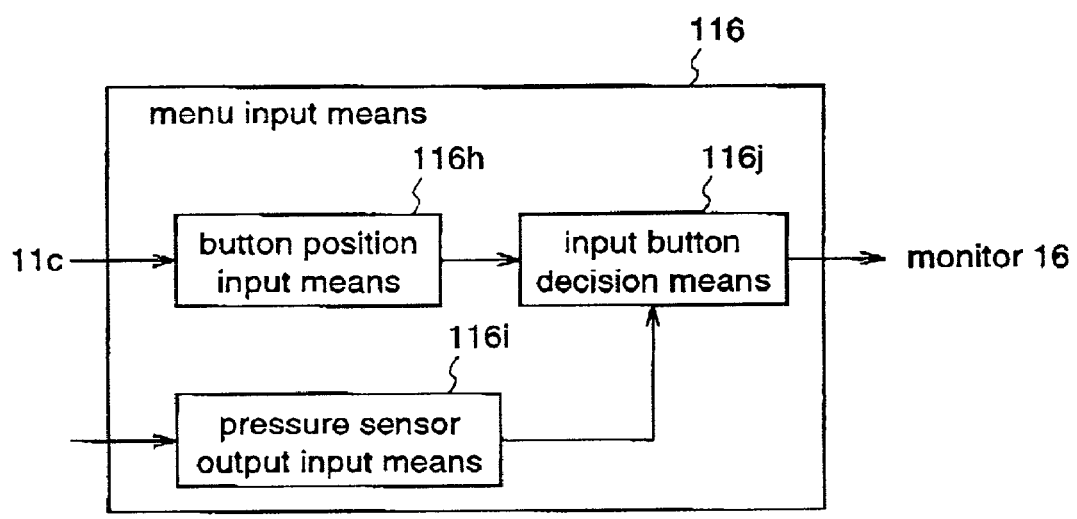
FIG. 19 is a block diagram illustrating another example of a menu input means.
Figure 20:
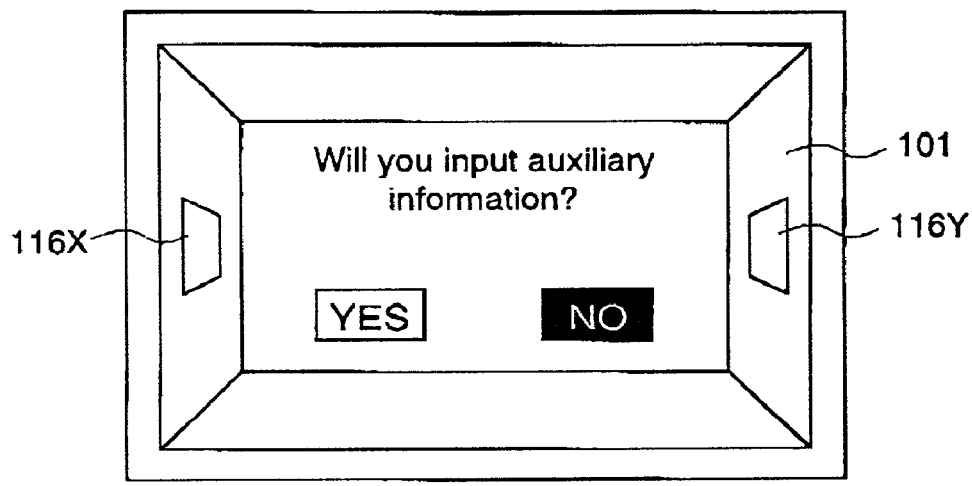
FIG. 20 is a diagram illustrating another example of an answer input according to the menu method.

Furthermore, as shown in FIGS. 17(a) and 17(b), option buttons 101a may be displayed in the viewfinder 101. In this case, the option (menu) buttons are automatically contrast-inverted (highlighted) one-by-one, and when the highlighted option button matches the option the user desires, the user selects this option button by appropriately combining the operations of the recording button 104, the power/operation mode switch 105, and the like as shown in FIG. 8. Alternatively, the user may select an option button by pressing the information switch 109, or the pressure sensor 119a, or the sweat sensor 119b, which is provided at the upper surface of the body as shown in FIG. 9, 10, or 11, with the fingers of the hand that grips the video camera. The successive contrast inversion of the option buttons is realized as follows. That is, as shown in FIG. 18, a button pattern formation means 11a, a button pattern inversion means 11b, and a button designation means 11c are implemented by software or the like in the CPU 11, and the contrast of a pattern of an option button which is generated by the button pattern formation means 11a is inverted by the button pattern inversion means 11b. At this time, the option buttons to be contrast-inverted (highlighted) are designated one-by-one by the button designation means 11c, whereby successive contrast inversion of the option buttons is realized. The button pattern formation means 11a, the button pattern inversion means 11b, and the button designation means 11c may be implemented by hardware outside the CPU 11. When the user lightly presses his/her eye onto a pad 101b of the viewfinder 101 as shown in FIG. 10, or winks as shown in FIG. 11, a pressure sensor (not shown) embedded in the pad 101b surrounding the viewfinder 101 senses this, whereby the corresponding option button is designated. In this case, in the menu input means 116, as shown in FIG. 19, a pressure sensor output input means 116i inputs the output from the pressure sensor, and an input button decision means 116j receives, through a button position input means 116h, information indicating an option button which is currently highlighted according to the output from the button designation means 11c. While the option buttons are highlighted one-by-one, when the user operates the pressure sensor by lightly pressing his/her eye onto the pad 101b at an option button he/she desires, the input button decision means 116j decodes this button as an input button. Alternatively, a light-emitting element 116X and a light sensor 116Y which are included in the viewfinder 101 as shown in FIG. 20 may be used instead of the pressure sensor. In this case, the light-emitting element 116X applies a weak light to the user's eye, and the light sensor 116X senses the reflected light from the eye to detect whether the user opens the eye or not, and the output from the light sensor is input to the sensor output input means 116i, thereby designating the corresponding option.

Figure 21:
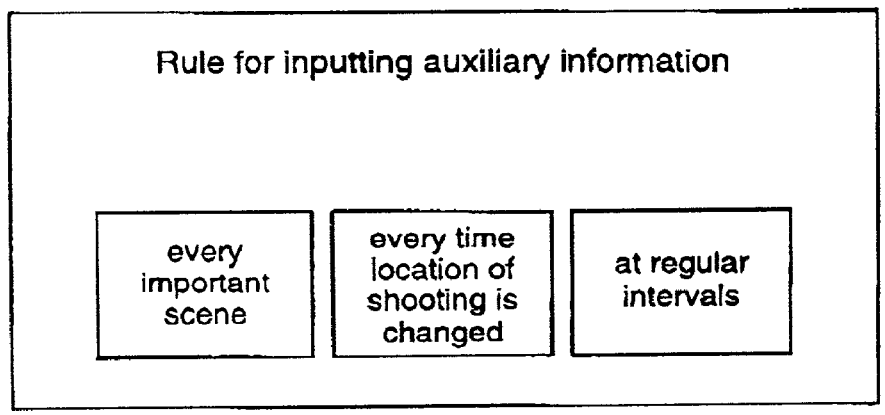
FIG. 21 is a diagram illustrating an example of a menu screen for selecting a rule for inputting auxiliary data.
Figure 21:
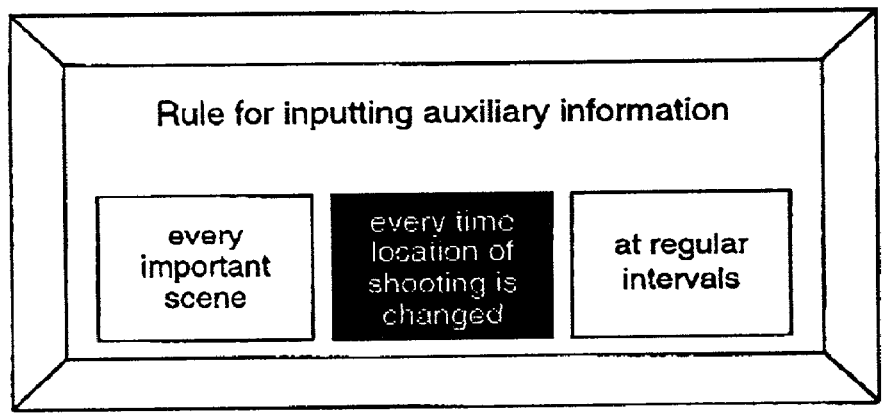
Figure 22:
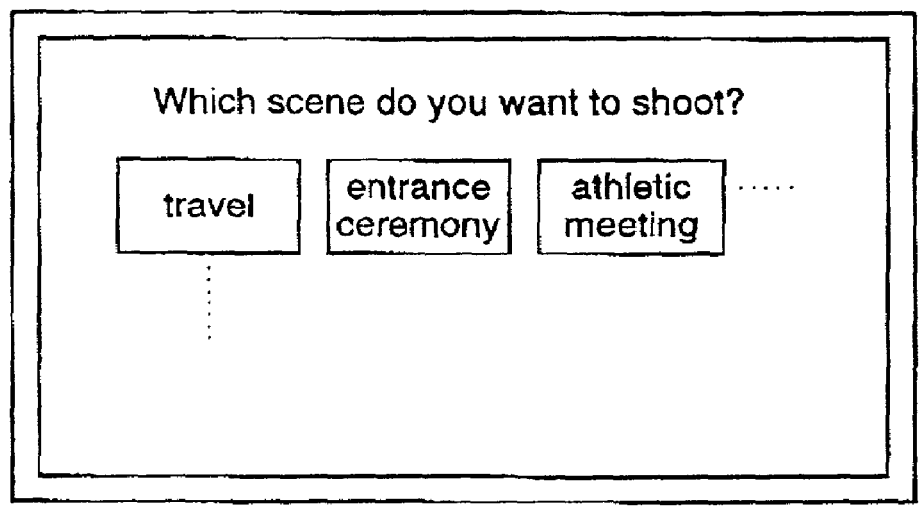
FIG. 22 is a diagram illustrating an example of a menu screen for selecting a target of capturing.
Figure 22:
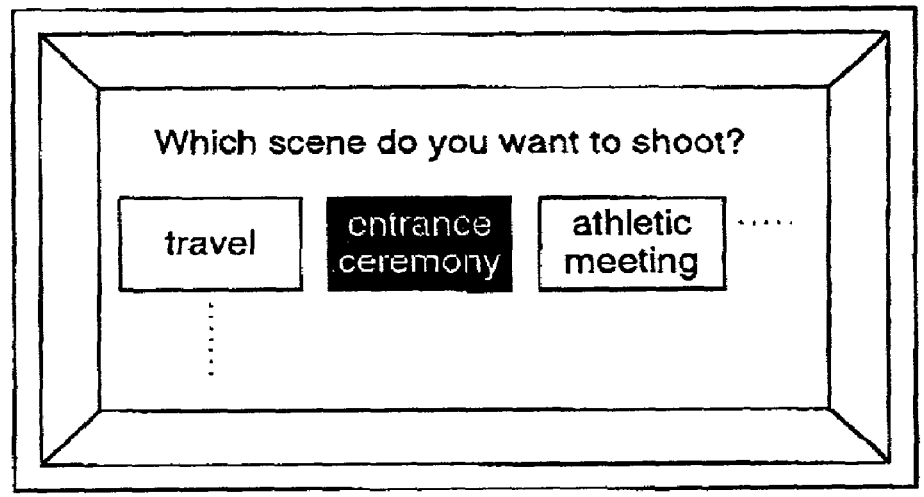

When the user does not select the type of auxiliary information, the instruction of inputting auxiliary information is canceled. On the other hand, when the user makes an instruction to select the type of auxiliary information, selection is carried out in step 23. At this time, the user may select a description to be used from descriptions of auxiliary information based on MPEG-7 or the like. However, it is difficult for the ordinary users to understand and execute such selection because the ordinary users are not expected to have knowledge about MPEG-7 and XML. Therefore, as shown by a menu on the monitor (FIG. 21(a)) or a menu in the viewfinder (FIG. 21(b)), the rule of inputting auxiliary information is selected from a menu having the following options. Recording auxiliary information for every important scene, inputting auxiliary information to a header or the like every time the capturing location is changed (this operation is achieved by combination with the power/operation mode switch), and inputting auxiliary information at predetermined intervals. The processes and circuits required at this time are implemented by the same method as the menu method for deciding whether the type of auxiliary information should be selected or not. Alternatively, as shown by a menu on the monitor (FIG. 22(a)) or a menu in the viewfinder (FIG. 22(b)), the type of auxiliary information may be selected, according to the purpose, from a menu having options such as snap capturing, storage/record, athletic meeting, entrance ceremony, etc., and the selected auxiliary information may be converted into a set of descriptions based on MPEG-7 or the like in the CPU 11. Although VideoSegement is used as the set of descriptions, the viewpoint can be changed according to each purpose.

The above-mentioned selection can be realized by storing description sets based on MPEG-7 or the like in a ROM (not shown), and selecting the contents in the ROM by the CPU 11 according to the menu option selected by the user.

Turning to FIG. 2, when capturing is started (step 24), a description of VideoSegment indicating a part of video is recorded as auxiliary information. During capturing, when the user desires to record auxiliary information, for example, when an important scene or a scene to be emphasized is being captured or at the instant when the scene is changed, the user presses the information button 109, and the CPU 11 detects it, generates auxiliary information, and records the auxiliary information. While in the example shown in FIG. 2 a description of VideoSegment and a description of importance are recorded in steps 27 and 28, respectively, the present invention is not restricted thereto. The auxiliary information selected in step 23 may be recorded. Furthermore, a plurality of information buttons, which are respectively assigned to different kinds of auxiliary information, may be provided on the body of the combined camera and VTR. In this case, the user presses any of these information buttons to record the corresponding auxiliary information. This operation is repeated until capturing is completed.

FIG. 3 shows an example of auxiliary information generated according to the first embodiment, and MPEG-7 is employed for the description. In this first embodiment, in contrast with the conventional method, XML description is employed. In FIG. 3, a description of MediaInformation between descriptors 301*a* and 301*b* describes the entire information of this video data. That is, it indicates that the file format of this video data is MPEG4. SegmentDecomposition shown by a descriptor 302 indicates that the VideoSegment, which is a part of the video data, is temporal, i.e., that the VideoSegment is arranged temporally. The above-mentioned description is generated and recorded after the power is turned on or before Segment description is started. In FIG. 3, a description between descriptors 303*a* and 303*b* is a description relating to one segment (=one scene), and it indicates that one scene continues for 1M19S (i.e., one minute and nineteen seconds) at 30F (i.e., 30 frames per sec.). The VideoSegment is followed by generated data, and a title indicated by a descriptor 304 and the like should be input not during capturing but after capturing. A description of PointOfView between descriptors 305*a* and 305*b* indicates the degree of importance, and it is expressed by a value for each ViewPoint as shown by a descriptor 306.

Figure 23:
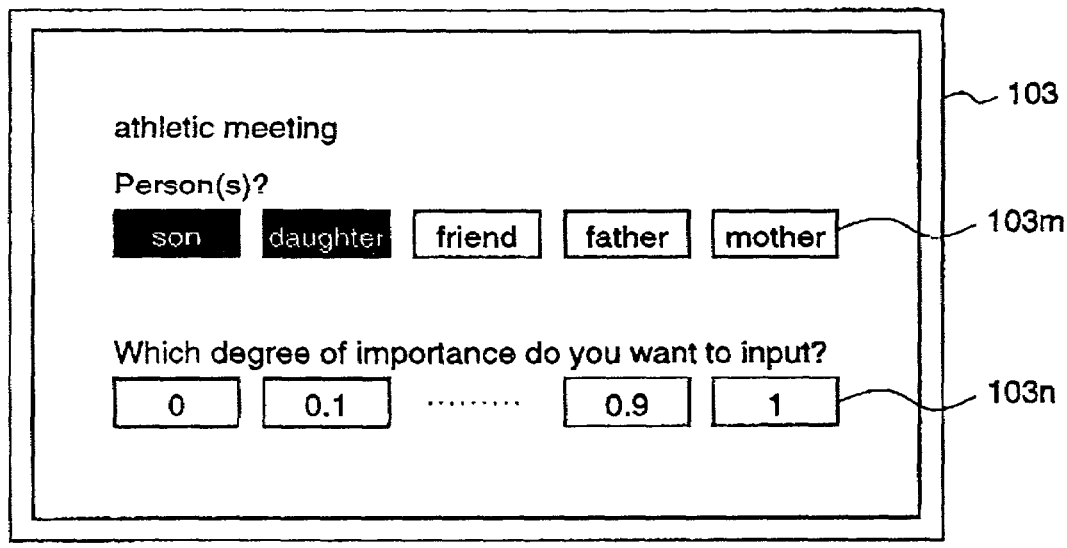
FIG. 23 is a diagram illustrating an example of a menu screen for selecting PointOfView and its degree of importance.
Figure 23:
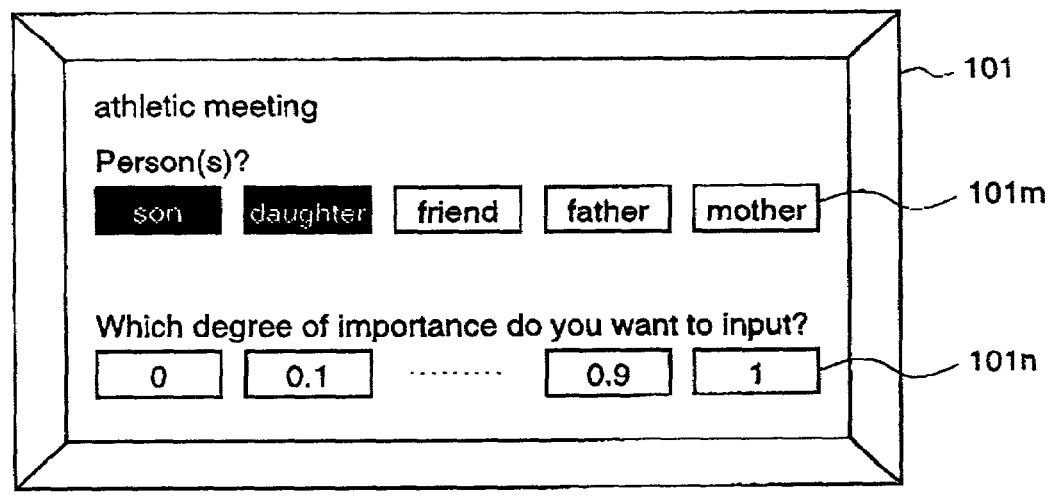

Generally, PointOfView indicates a point for discrimination from another object. The user may input all of the auxiliary information by XML description, or XML description may be automatically generated by preparing a plurality of menus on assumption of user conditions, and selecting a menu most appropriate to the capturing condition from the menus. For example, when capturing a scene in which a son and a daughter appear in an athletic meeting, as shown in FIG. 23(*a*) (menus on the monitor) or FIG. 23(*b*) (menus in the viewfinder), in a menu of "athletic meeting", buttons 103*m*, 103*n*, 101*m*, 101*n* corresponding to tags of "son", "daughter", "excitement" are prepared in advance, and a value, i.e., the degree of importance, is shown according to the time length of a scene where the son and the daughter appear.

Figure 24:
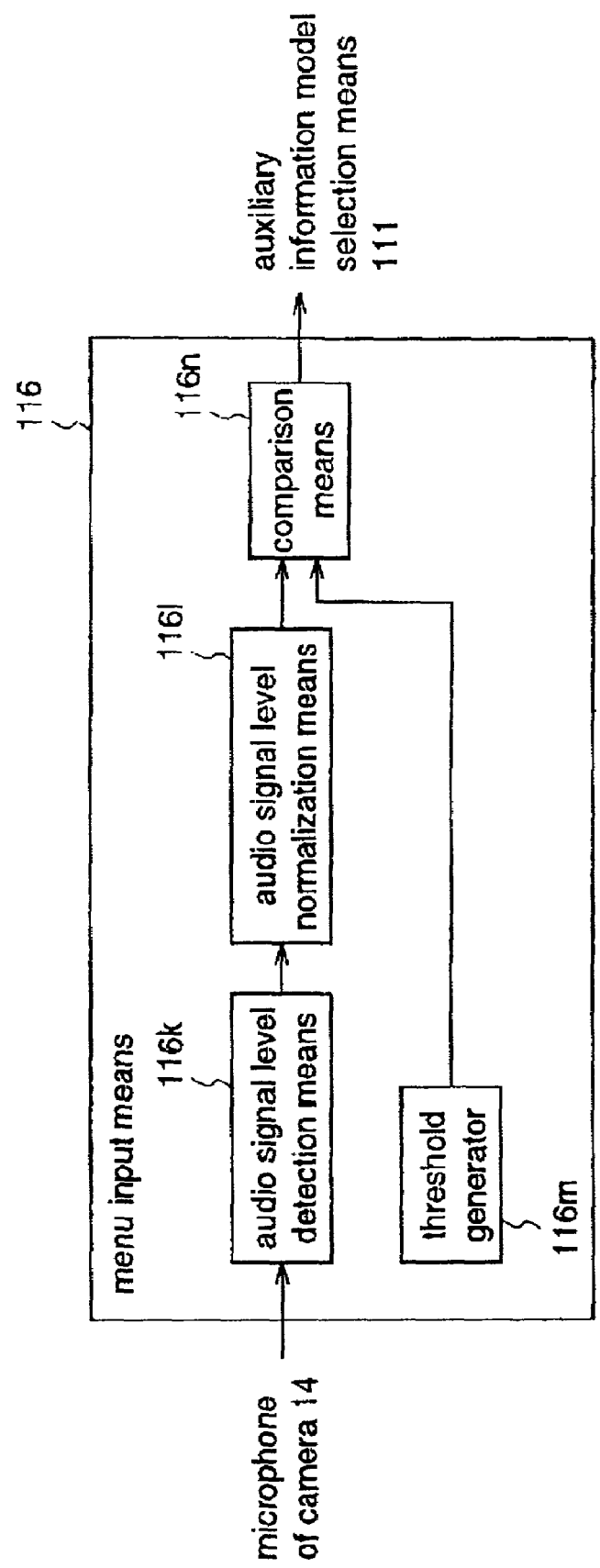
FIG. 24 is a block diagram illustrating another example of a menu input means.

Further, "excitement" means a climax, and this description can be recorded by operating the information button or the like provided on the equipment. The simplest method of setting the value of excitement is setting the value of importance at either "0" (=not important) or "1" (=most important). However, one of the value buttons shown in the menu on the monitor or the menu in the viewfinder may be selected by the menu method, i.e., in the same manner as that described for the case of answering to a question as to whether the type of auxiliary information should be selected or not. At this time, values in increments of "0.1" may be input between "0" and "1" by combination of pressing the power key and the recording key, and one of these values may be selected. Alternatively, when an excitement button is provided at the upper surface of the body of the combined camera and VTR, the user may input a value of excitement by operating this button. Furthermore, a value of excitement may be input by sensing the degree of excitement of the user from the fingers of the user which are put on a pressure sensor or a sweat sensor provided at the upper surface of the body. Furthermore, as shown in FIG. 24, the loudness of cheers or the loudness of user's voice at capturing may be measured, and the value of excitement may be input according to the measured value. In this case, the level of an audio signal obtained by a microphone (not shown) of the camera 14 is detected by an audio signal level detecting means 116*k*, and this level is normalized by an audio signal level normalization means 116*l*. Then, a comparison means 116*n* compares the normalized level with a plurality of thresholds which are generated by a threshold generator 116*m*, whereby a value to be designated as a menu input can be selected automatically.

As described above, since auxiliary information is generated in connection with the capturing operation, the user can easily generate auxiliary information at capturing. Further, PointOfView may be input after capturing.

The degree of importance or the value of excitement input, as described above, can be displayed singly on the liquid crystal monitor or the view pointer, or it can be superimposed on the monitor picture during capturing, whereby the user can confirm the input value. Further, an icon corresponding to the contents of a message may be colored with a color according to the degree of importance, or the lightness in color of the icon may be increased according to the value, whereby the user can confirm the input value.

Figure 25:
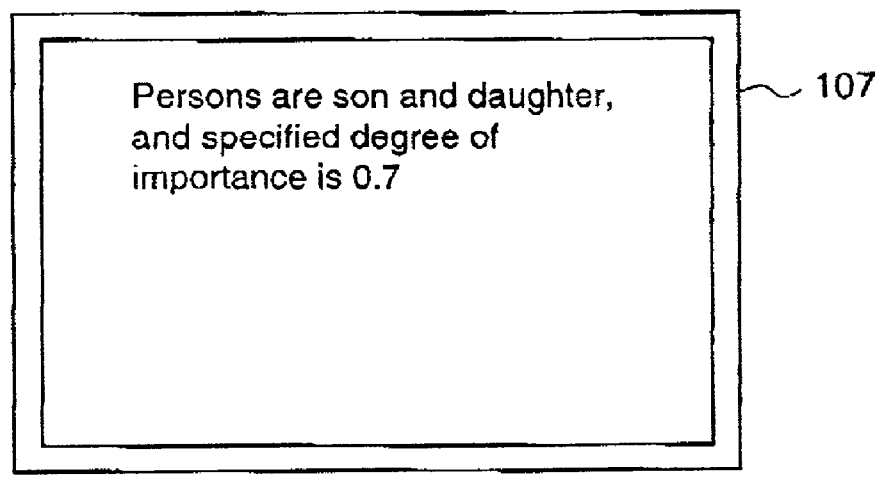
FIG. 25 is a diagram illustrating an example of a screen showing PointOfView and its degree of importance which are selected from the menu.
Figure 25:
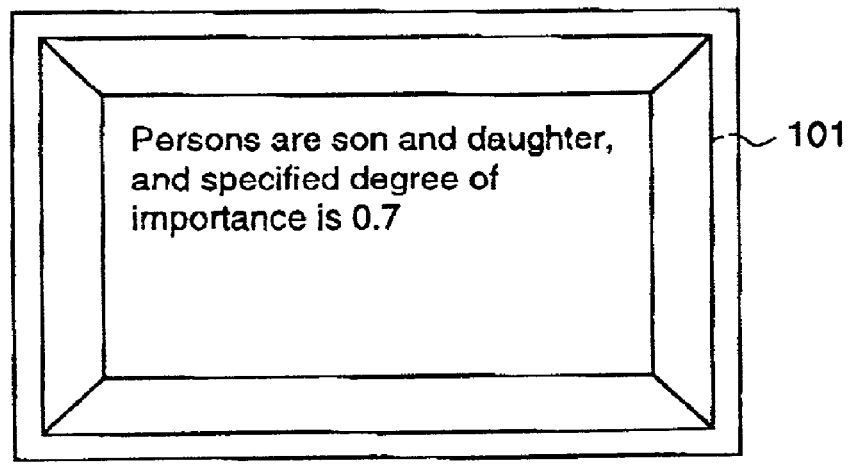
Figure 27:
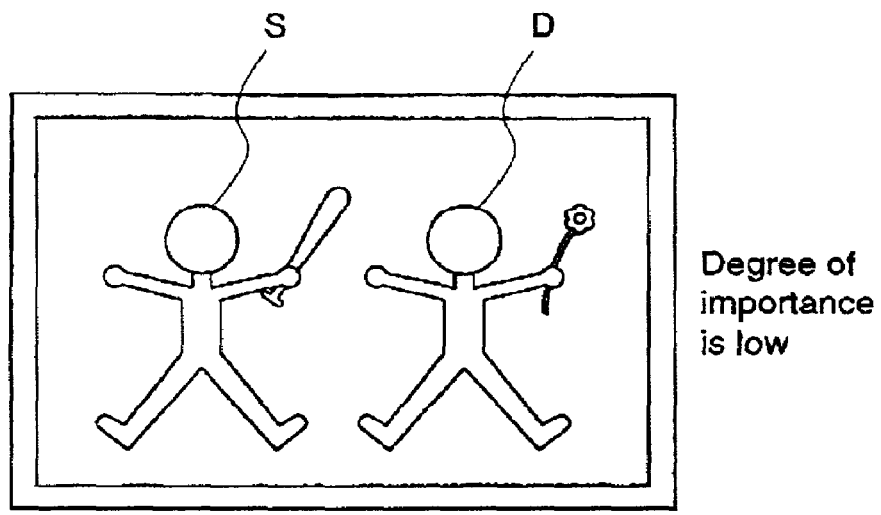
FIG. 27 is a diagram illustrating another example of a screen showing PointOfView and its degree of importance which are selected from the menu.
Figure 27:
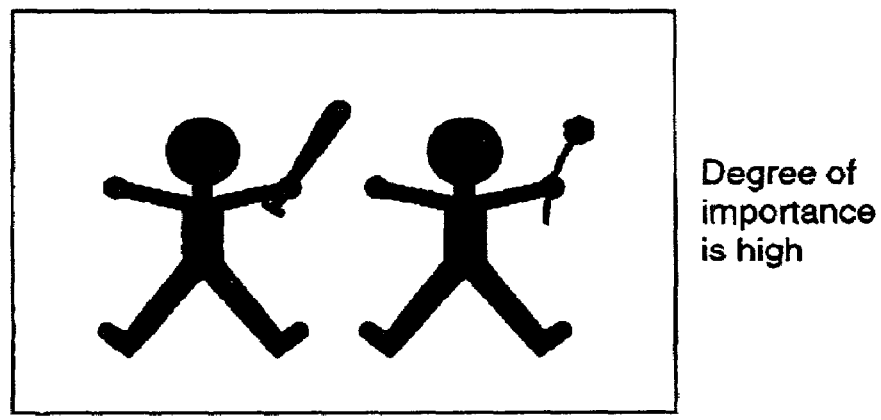
Figure 28:
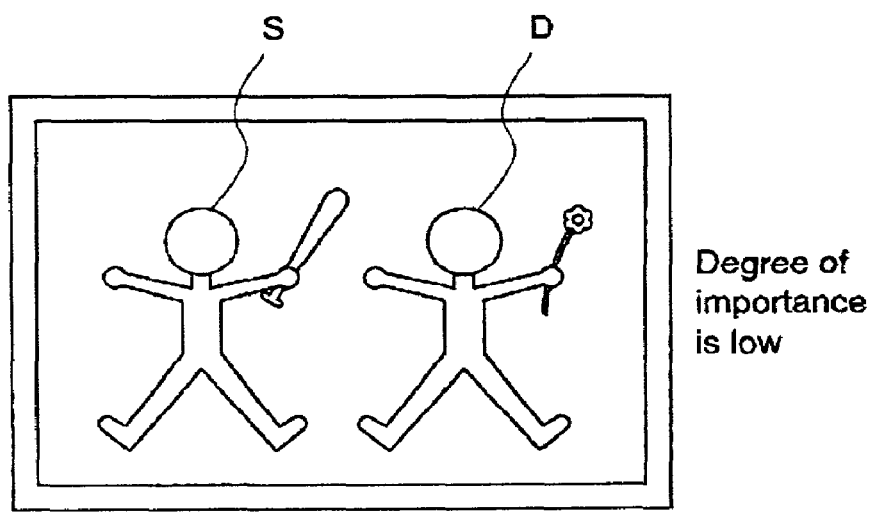
FIG. 28 is a diagram illustrating another example of a screen showing PointOfView and its degree of importance which are selected from the menu.
Figure 28:
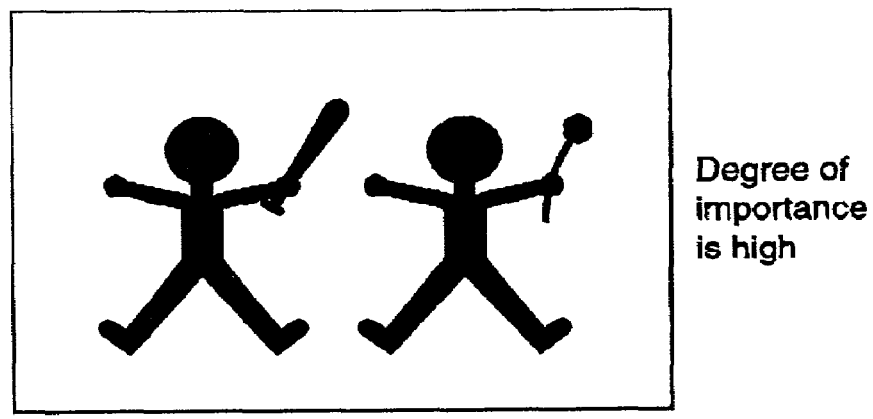

For example, as shown in FIG. 25, the importance of specified persons or the importance of excitement may be displayed on the monitor 103 or the viewfinder 101 by switching the screen from the scene being captured, or it may be superimposed on the scene being captured. Furthermore, as shown in FIG. 27, specified persons may be indicated by icons S and D, and the importance of excitement may be indicated by the color of the icons. FIG. 27(*a*) shows the case where the degree of importance is low, and FIG. 27(*b*) shows the case where the degree of importance is high. Further, as shown in FIG. 28, the importance of excitement may be indicated by the brightness in color of the icons. FIG. 28(*a*) shows the case where the degree of importance is low, and FIG. 27(*b*) shows the case where the degree of importance is high.

Figure 26:
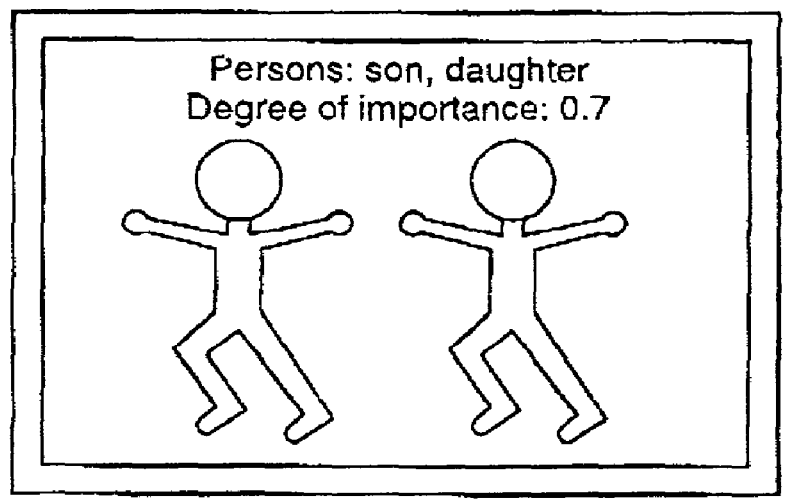
FIG. 26 is a diagram illustrating another example of a screen showing PointOfView and its degree of importance which are selected from the menu.
Figure 26:
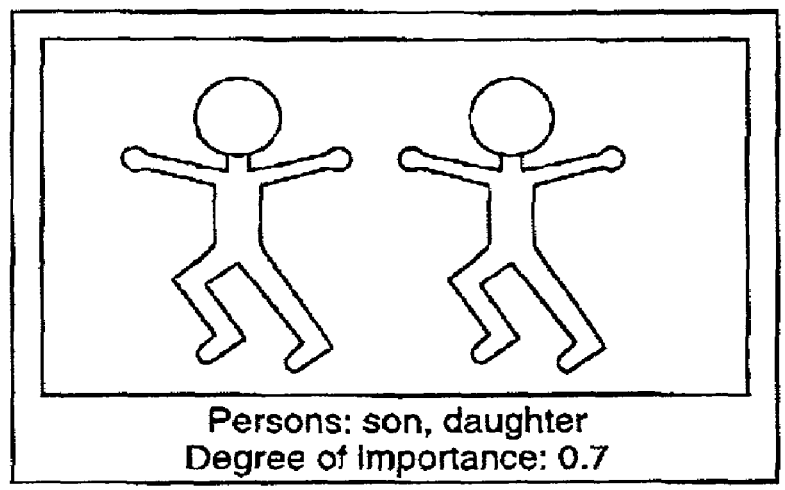
Figure 29:
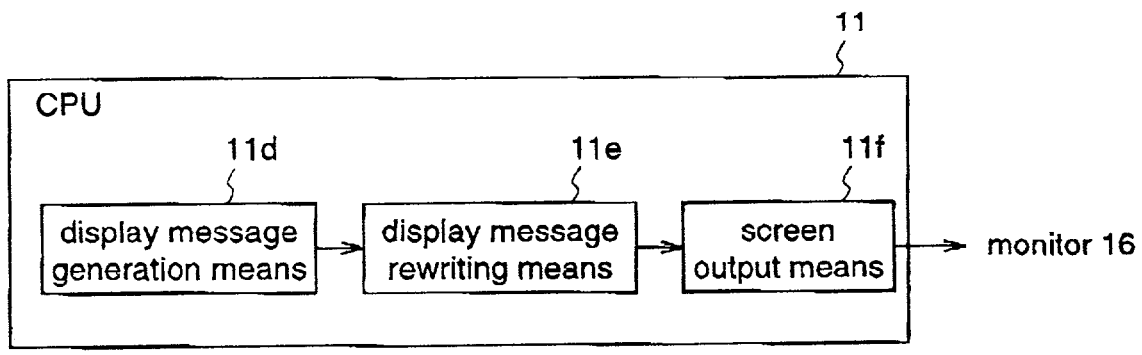
FIG. 29 is a block diagram illustrating the internal structure of a CPU which enables the screen display shown in FIG. 25.
Figure 30:
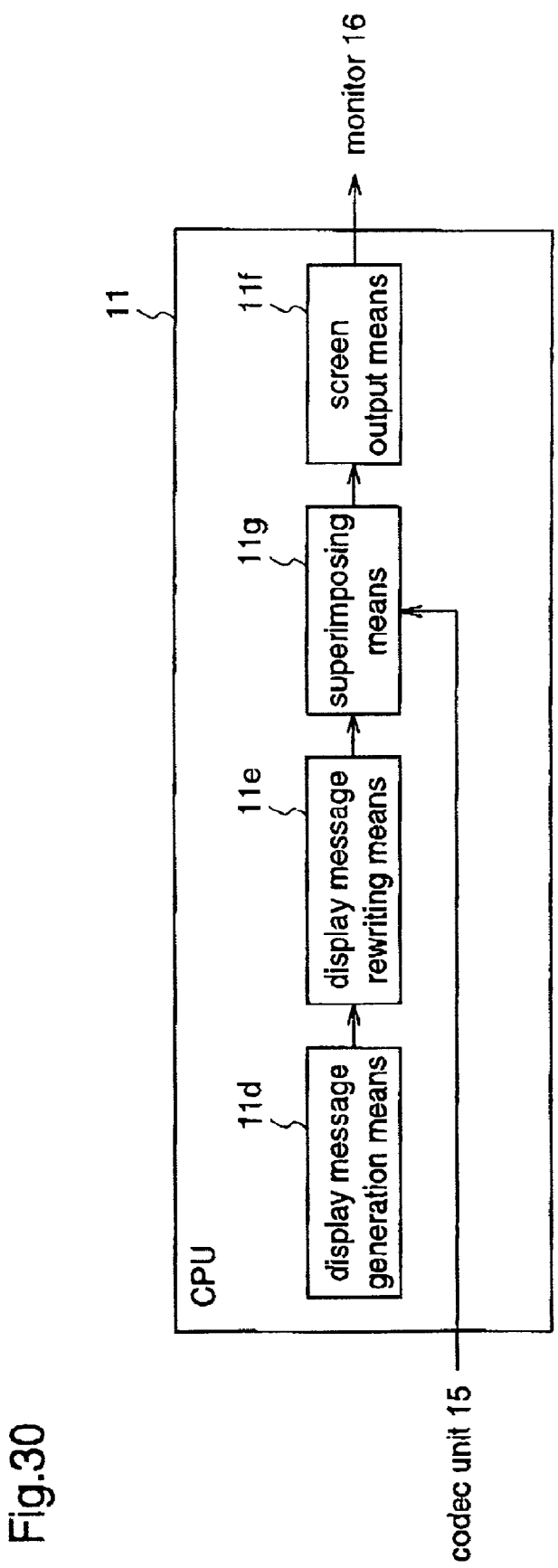
FIG. 30 is a block diagram illustrating the internal structure of a CPU which enables the screen display shown in FIG. 26(a).
Figure 31:
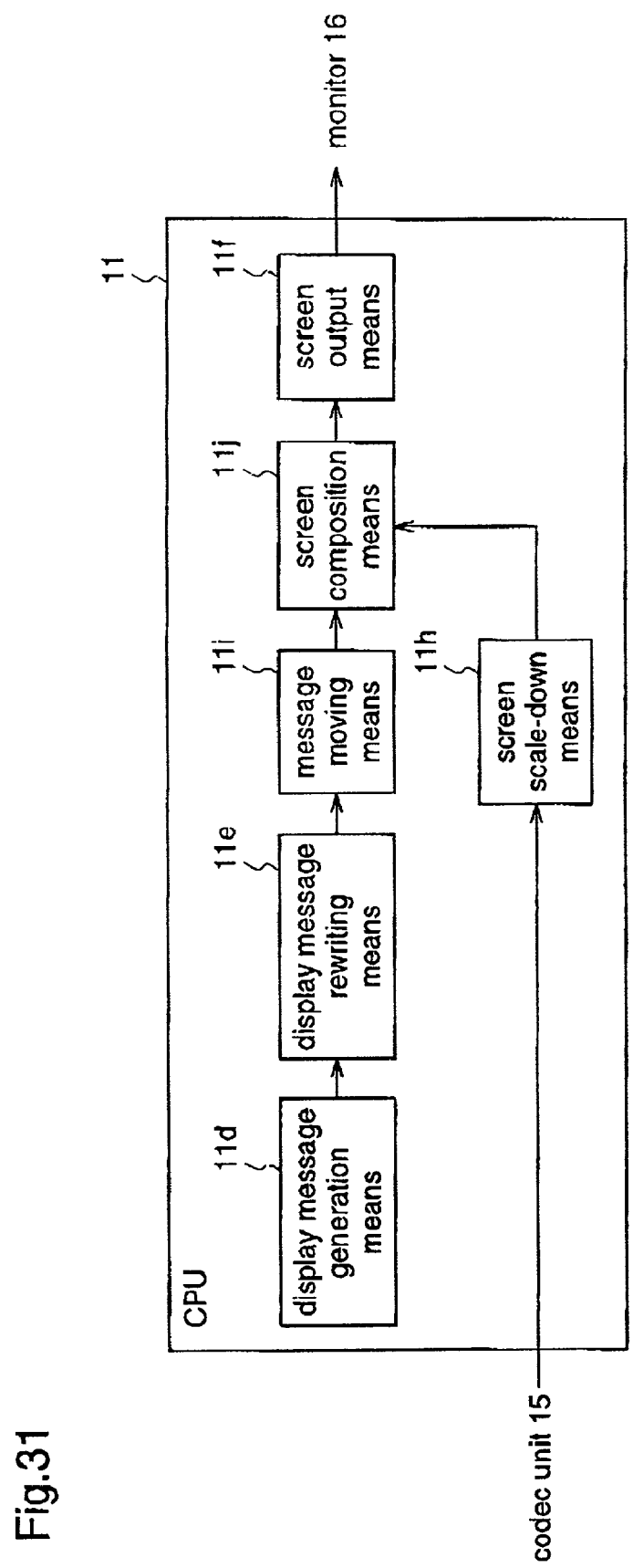
FIG. 31 is a block diagram illustrating the internal structure of a CPU which enables the screen display shown in FIG. 26(b).
Figure 32:
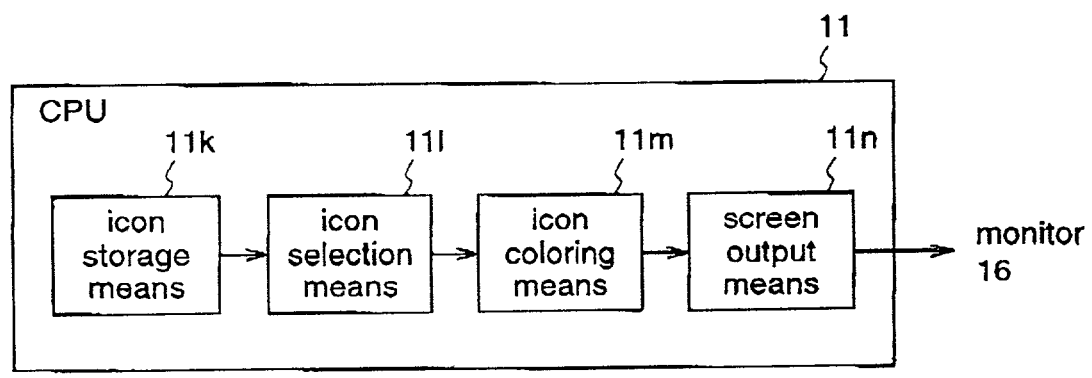
FIG. 32 is a block diagram illustrating the internal structure of a CPU which enables the screen display shown in FIG. 27.
Figure 33:
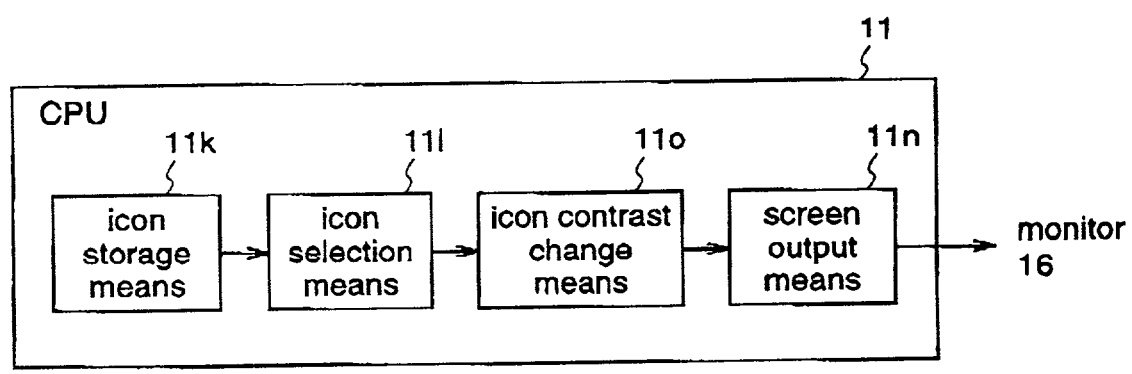
FIG. 33 is a block diagram illustrating the internal structure of a CPU which enables the screen display shown in FIG. 28.

The screen display shown in FIG. 25 is realized as follows. As shown in FIG. 29, the CPU 11 is provided with a display message generation means 11*d*, a display message rewriting means 11*e*, and a screen output means 11*f*, and parameters in a typical display message which is generated by the display message generation means 11*d* (in FIG. 25, "son", "daughter", "0.7") are rewritten by the display message rewriting means 11*e* and, thereafter, the rewritten display message is output to the monitor 16 by the screen output means 11*f*. The display message generation means 11d, the display message rewriting means 11e, and the screen output means 11f may be implemented by hardware outside the CPU 11. A screen display shown in FIG. 26(a) is realized as follows. As shown in FIG. 30, a superimposing means 11g is placed between the display message rewriting means 11e and the screen output means 11f shown in FIG. 29, and a message "persons: son and daughter, degree of importance=0.7" is superimposed on the picture being captured, which is output from the codec unit 15. Further, a screen display shown in FIG. 26(b) is realized as follows. As shown in FIG. 31, the picture being captured, which is output from the codec unit 15, is scaled down by a screen scale-down means 11h, and a message screen output from the display message rewriting means 11e is moved to the lower part of the monitor screen by a message moving means 11i. Then, these screens are composited by a screen composition means 11j, and the composite screen is output to the monitor 16 by the screen output means 11f. The screen display shown in FIG. 27 is realized as follows. As shown in FIG. 32, an icon corresponding to a message is selected by an icon selection means 111 from an icon storage means 11k which stores a plurality of icons corresponding to the menu, and the selected icon is colored according to the degree of importance by an icon coloring means 11m, and the colored icon is output to the monitor 16 by the screen output means 11n. Further, the screen display shown in FIG. 28 is realized as follows. As shown in FIG. 33, using an icon contrast changing means 11o instead of the icon coloring means 11m shown in FIG. 32, the contrast of the icon is changed according to the degree of importance.

By the way, in the example shown in FIG. 3, since the appearance time of "son" is only "0.2" in the initial video segment Seg0 while the appearance time of "daughter" is "0.6", this scene lacks interest, and therefore, the value of excitement is set at "0.1". In the next video segment Seg1, since both "son" and "daughter" appear for the same appearance time "0.6", this scene is interesting, and therefore, the value of excitement is set at "0.8". Although, in the above description, the degree of importance is the appearance time in one scene, it is also possible to express the degree of importance by the value of excitement or the value of "son" or "daughter" (frequency of appearance). Further, the degree of importance may be determined by combining the sizes of "son" and "daughter" on the screen and the values of a plurality of viewpoints. Further, although "son" and "daughter" are selected as a sub menu of a menu "athletic meeting", these may be selected as examples of viewpoints, and this selection can be executed by selecting a value button in PointOfView.

As described above, since a menu is selected according to the capturing condition and required parameters are selected from the menu, auxiliary information can be generated without necessity of knowledge about XML rule, and the generated auxiliary information can be attached to the original captured data.

That is, when the user selects a menu through the menu input means 116 shown in FIG. 5, the auxiliary information pattern selection means 111 selects one of the auxiliary information patterns which correspond to different menus and are stored in the menu-basis auxiliary information storage means 110. In the example of FIG. 3, <PointOfView Viewpoint="son">, <PointOfView Viewpoint="daughter">, <PointOfView Viewpoint="exciting">, . . . correspond to the patterns. In the auxiliary information pattern corresponding to the selected menu, a portion corresponding to a variable should be rewritten. That is, this portion is selected by selecting a tag prepared in the menu, and the auxiliary information pattern rewriting means 112 changes the variable in the auxiliary information pattern to the information specified by the user, according to the tag, thereby completing the auxiliary information. In the example of FIG. 3, the variable is <Value>, and this is changed to the value specified by the user (e.g., "0.6", "0.8", etc.). Thereafter, as shown in FIG. 5, the auxiliary information recording means 114 records the completed auxiliary information in the header section of a scene or the like according to a timing specified by the user through the auxiliary information recording timing input means 117. The recording timing control means 113 controls the recording means 114 so that the auxiliary information is recorded in the header section of a scene corresponding to the timing specified by the user.

Figure 34:
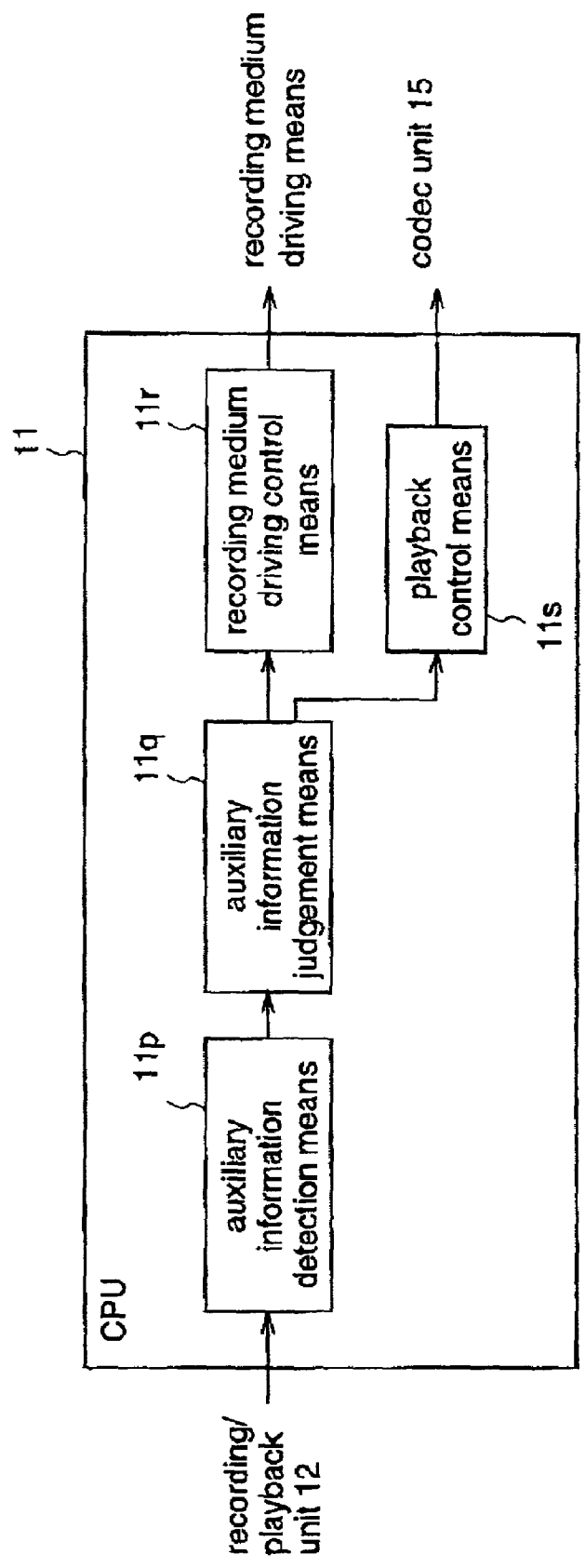
FIG. 34 is a block diagram illustrating the internal structure of a CPU which controls the combined camera and digital VTR.

Hereinafter, a description will be given of the case where the combined camera and VTR reproduces the recorded video data, using the auxiliary information recorded as described above. As shown in FIG. 34, an auxiliary information detection means 11p detects the auxiliary information from a signal which is reproduced from the recording medium by the recording/playback unit 12, and an auxiliary information judgement means 11q judges whether or not the degree of importance of the auxiliary information is larger than a value set by the user, for example "0.5". When the degree of importance is larger than the set value, a recording medium drive control means 11r sets the recording medium playback speed of a recording medium drive means (not shown) at "normal playback", and a playback control means 11s controls the codec unit 15 so as to decode a signal reproduced at this time. On the other hand, when the degree of importance is smaller than "0.5" which is set by the user, the recording medium drive control means 11r sets the recording medium playback speed of the recording medium drive means (not shown) at "fast-forward mode", and the playback control means 11s controls the codec unit 15 so as not to decode the reproduced signal, whereby playback skipping of a section having a low degree of importance is achieved.

As described above, according to the first embodiment of the present invention, in the combined camera and digital VTR, parameters in a model of auxiliary information can be input according to a method which is familiar to the ordinary users, without premising knowledge about MPEG-7 which cannot be expected from the ordinary users. For example, the parameters are input by combining operations of the recording switch, the power button, and the like which are operated in synchronization with capturing operation by the user, by operating the buttons of menu options which are displayed on the monitor, by operating the information switch which is provided on the body of the VTR, by touching or pen-writing on the liquid crystal monitor, or by sensing the user's eye against the viewfinder. Thereby, the user can input the auxiliary information, and can easily obtain index information when the captured moving picture is played back later.

While in this first embodiment whether auxiliary information should be selected or not is decided by the user every time the power button is turned on, the present invention is not restricted thereto. Whether auxiliary information should be selected or not may be set independently of turn-on of the power button. For example, in "VideoSegment", only the values such as "View" which are likely to change during capturing may be generated at capturing while other values are generated in advance of capturing. Also in this case, the same effects as described above are achieved. Further, while in this first embodiment auxiliary information is generated in synchronization with the capturing button, there is a case where a camera or the like is set such that the power is turned off manually or automatically for long battery life. In order to cope with such case, auxiliary information may be generated in synchronization with the on/off of the power.

Further, while in this first embodiment the descriptions of XML or the like are explained for only several kinds of parameters, the present invention is not restricted thereto, and it is possible to select desired parameters from a menu according to the purpose. Further, although the first embodiment is described on the premise that a captured picture is recorded, a captured picture is not necessarily recorded, and it can be used also when compressed video and audio data are transmitted as they are to be used on a network or the like. Furthermore, although auxiliary information is generated at capturing, it is also possible to generate auxiliary information at playback by using the information button at the time of playback, i.e., when playing a picture captured by the combined camera and VTR itself to confirm the picture. When recording or transmitting the generated auxiliary information, it is decided, according to the construction of the device or system, as to whether the auxiliary information should be recorded/transmitted after being multiplexed in the captured video and audio data, or it should be stored in another place for recording/transmission so that the auxiliary information can be recorded/transmitted independently of the captured video and audio data.

Furthermore, it is also possible to detect a section in the video data corresponding to a degree of importance specified by the user, and reproduce only this section to be displayed on the monitor. Therefore, the CPU can extract only data having a high degree of importance from the video data recorded on the recording medium, and reproduce the extracted data, whereby confirmation of the recorded data by the monitor can be carried out with efficiency. Further, the user can enjoy the recorded "work" without feeling tired, and the power consumption is reduced to secure more driving time.

Embodiment 2

Hereinafter, an image data generation method according to a second embodiment of the present invention will be described with reference to the drawings.

The image data generation method according to the second embodiment will be described taking, as an example, a case where an auxiliary information generation apparatus is contained in a handy phone having a movie function or a camera function.

Figure 35:
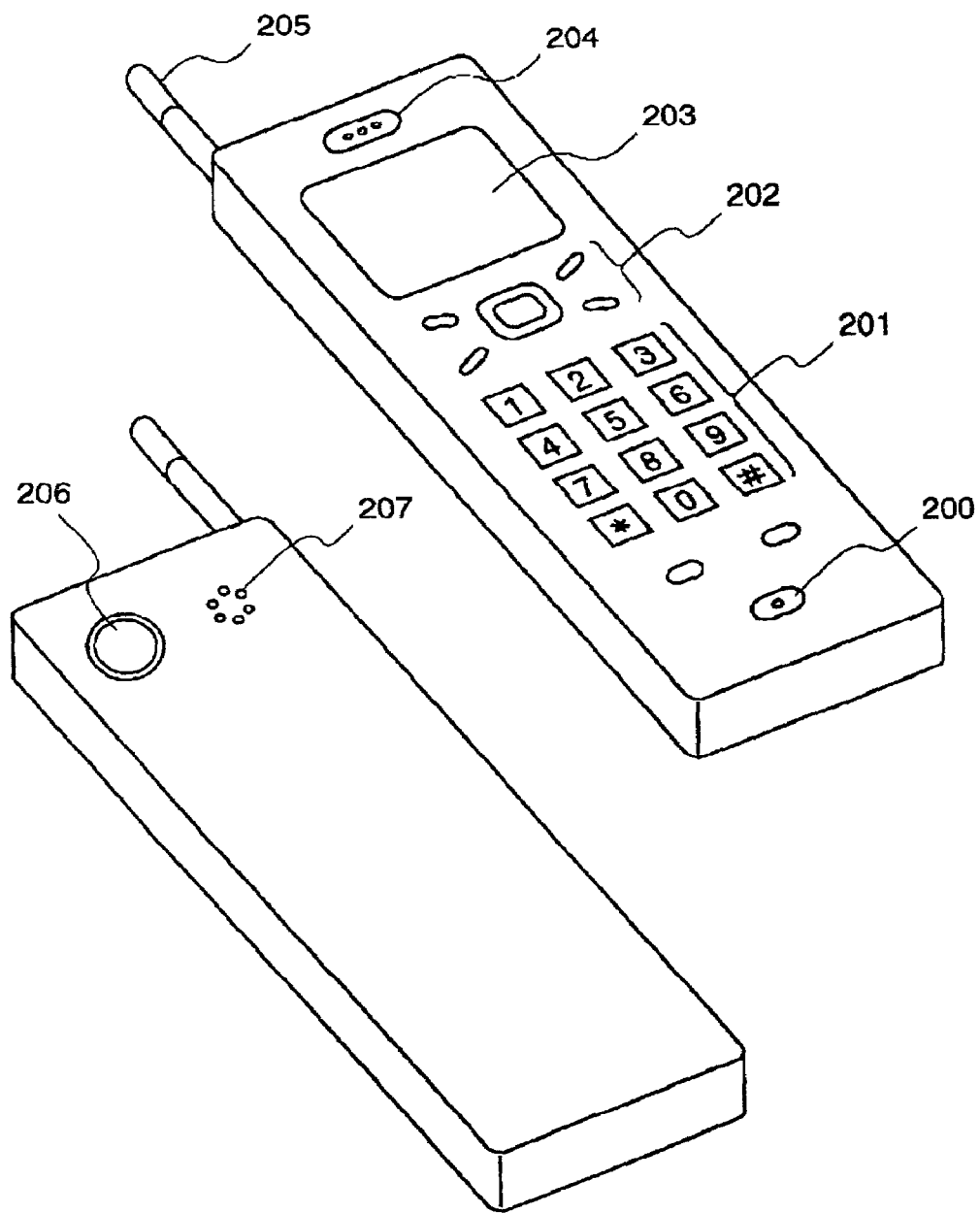
FIG. 35 is a diagram illustrating a handy phone including an auxiliary information generator according to a second embodiment of the present invention.

FIG. 35 shows a handy phone having a movie function or a camera function. The handy phone has a lens 206 for capturing the back of its body, and a light-to-electricity converter (not shown) inside the body, whereby a captured (moving) picture can be attached to a mail or the like, and transmitted through a mobile communication network. The sound during picture capturing is received by a microphone 207. In FIG. 35, reference numeral denotes a microphone for conversation, 201 denotes a ten key, denotes a function key, 203 denotes a liquid crystal display, denotes a speaker for conversation, and 205 denotes a whip antenna.

Figure 36:
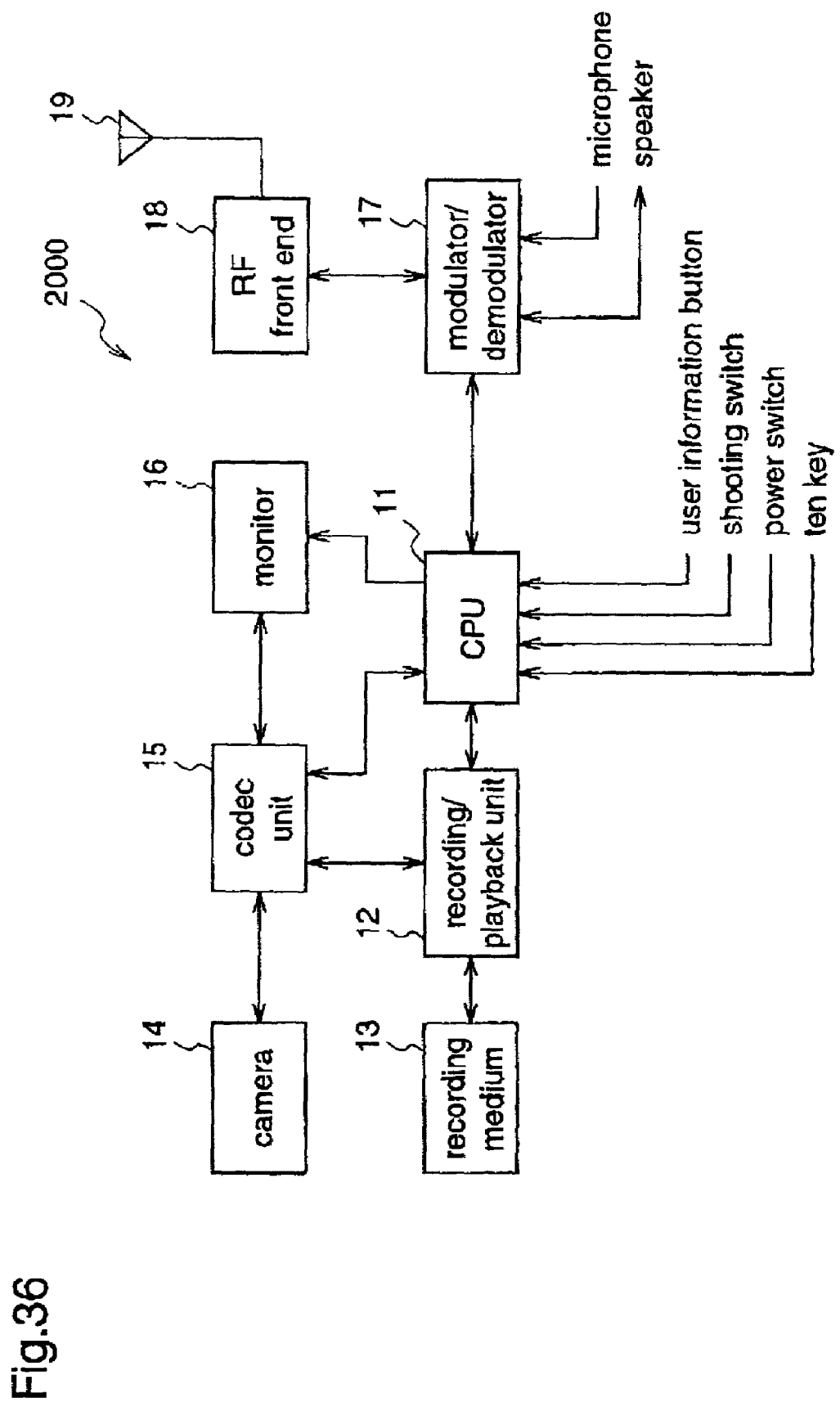
FIG. 36 is a block diagram illustrating the handy phone including the auxiliary information generator according to the second embodiment.

FIG. 36 is a block diagram of a handy phone 200 having an auxiliary information generation apparatus (CPU 11) according to the second embodiment of the invention. This handy phone has a movie function or a camera function. In FIG. 36, the same reference numerals as those shown in FIG. 1 denote the same or corresponding parts. Further, reference numeral 19 denotes an antenna, 18 denotes an RF front end for processing a high-frequency signal which is received/transmitted by the antenna 19, and 17 denotes a modulation/demodulation unit for modulating/demodulating the sound from the microphone, and outputting an audio signal to the speaker.

The operation of the handy phone from generation of auxiliary information to generation of video data is identical to that described for the combined camera and digital VTR having the auxiliary information generator according to the first embodiment of the invention. In the handy phone, auxiliary information relating to digital data is generated and attached to (moving) picture data captured by the camera function during capturing or after capturing, and only a portion of the digital data having a high priority is extracted using the auxiliary information to generate reduced digital data, and the reduced digital data so generated is attached to a mail or the like to be transmitted, whereby the communication cost is reduced.

Since the function of generating and adding auxiliary information and the playback operation by itself are identical to those described for the first embodiment, repeated description is not necessary. However, the recording medium 13 shown in FIG. 36 is limited to a semiconductor memory and, in this case, the recording medium drive control means 11r is a memory address jumping means. Further, the playback control monitor 16 is limited to a liquid crystal display.

Figure 37:
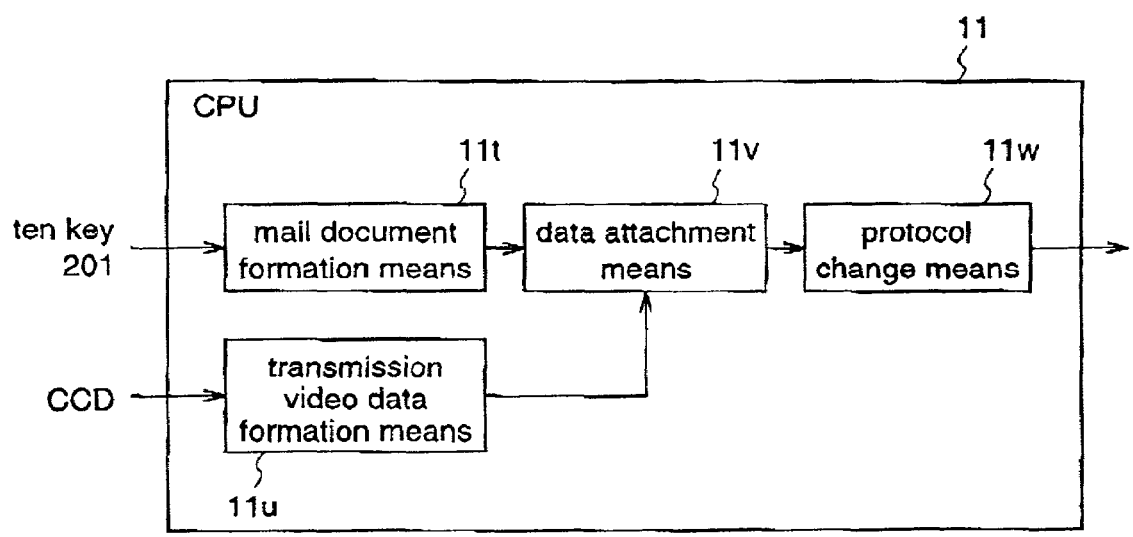
FIG. 37 is a block diagram illustrating a mail formation function and a (moving) picture attachment function, of the handy phone according to the second embodiment.

FIG. 37 is a block diagram illustrating the construction for implementing mail formation and (moving) picture attachment. To be specific, in FIG. 37, when the user operates the ten key 201, a mail document formation means 11t forms a mail document by appropriately selecting characters and numbers from a plurality of characters and numbers which are assigned to each key. As described above, auxiliary information is added to picture data which has been obtained by capturing a picture with the lens 206 and subjecting the picture to light-to-electricity conversion by the light-to-electricity converter (not shown) such as a CCD. A transmission picture data formation means 11u forms picture data to be transmitted (hereinafter, referred to as transmission picture data) by extracting, from the obtained picture data, only a section where the degree of importance of the auxiliary information is higher than a predetermined value. A data attachment means 11v converts this transmission picture data into a file to be attached to the mail document. A protocol conversion means 11w converts the protocol so that the mail document to which the transmission picture data is attached can be output to a network such as the Internet.

In this second embodiment, decision as to whether auxiliary information should be generated or not, decision as to whether auxiliary information should be selected or not, selection of persons, input the value of importance of excitement, and the like are carried out in the same manner as described for the combined camera and VTR according to the first embodiment. To be specific, when a menu is displayed on the liquid crystal display, the user selects an option button with the function key or the user information button, or the user selects an option button by putting a finger on a portion corresponding to the option button on a touch panel which is provided on the liquid crystal display. Alternatively, when only a question is displayed on the liquid crystal display, the user inputs an answer to this question by using the ten key or the function key, or the user inputs an answer by hand-writing on the touch panel, or the user selects an answer by putting a finger on a pressure sensor or a sweat sensor which is provided on the body of the handy phone. Further, an answer to the question may be selected by detecting the level of cheers or user's voice which is picked up by the microphone.

Figure 38:
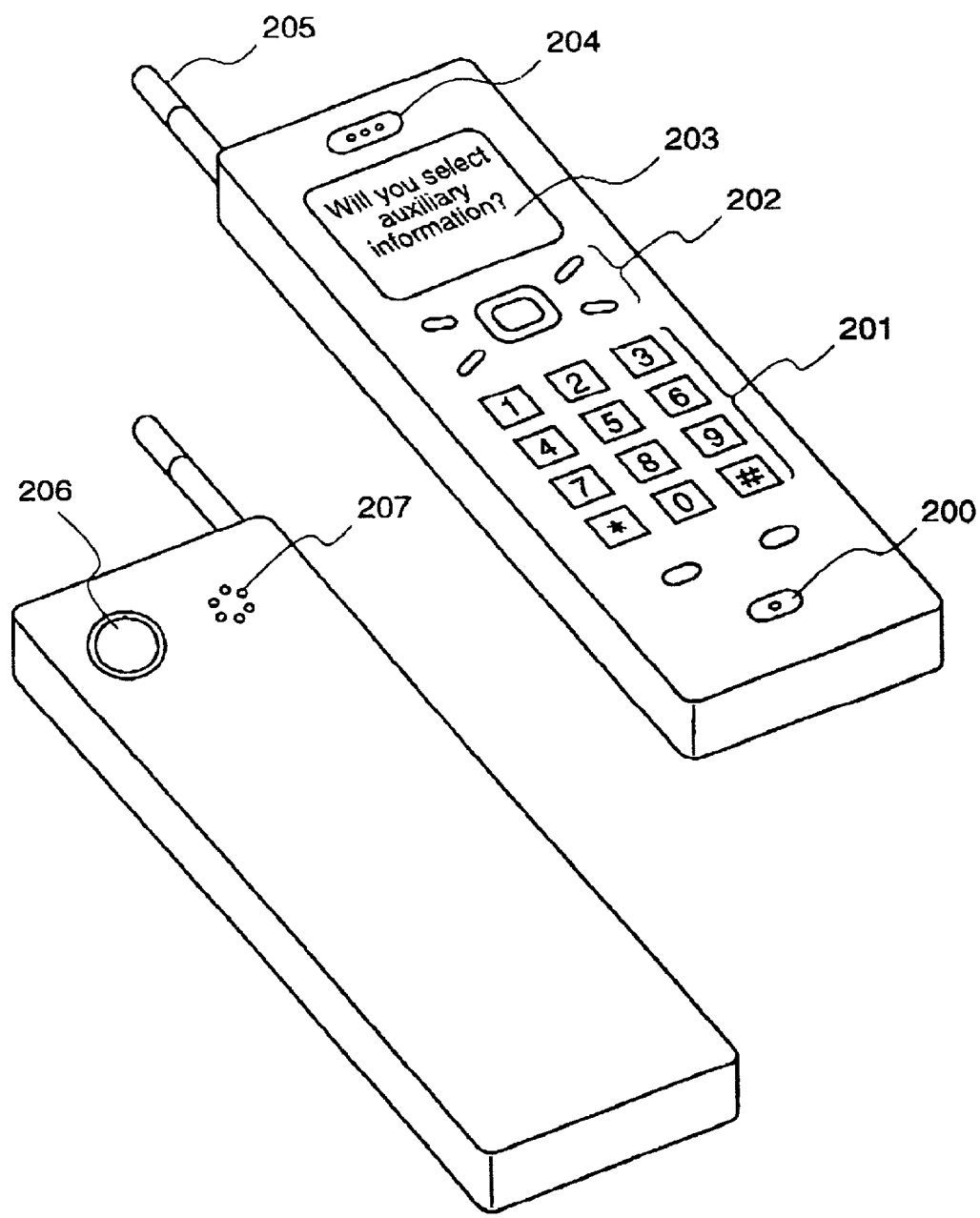
FIG. 38 is a diagram illustrating the state where a question is displayed on a liquid crystal display of the handy phone according to the second embodiment.
Figure 39:
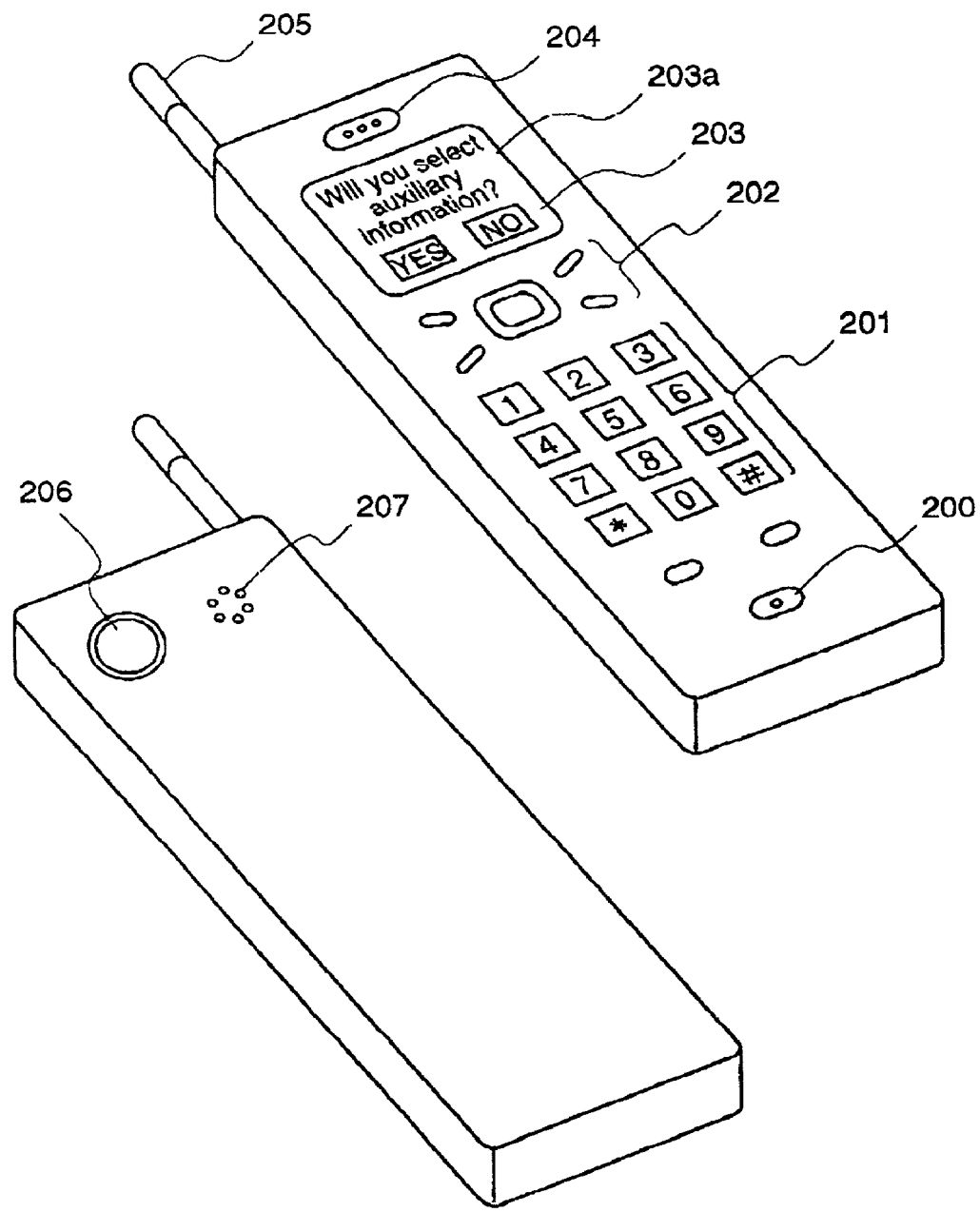
FIG. 39 is a diagram illustrating the state where question and answer buttons are displayed on the liquid crystal display of the handy phone according to the second embodiment.
Figure 40:
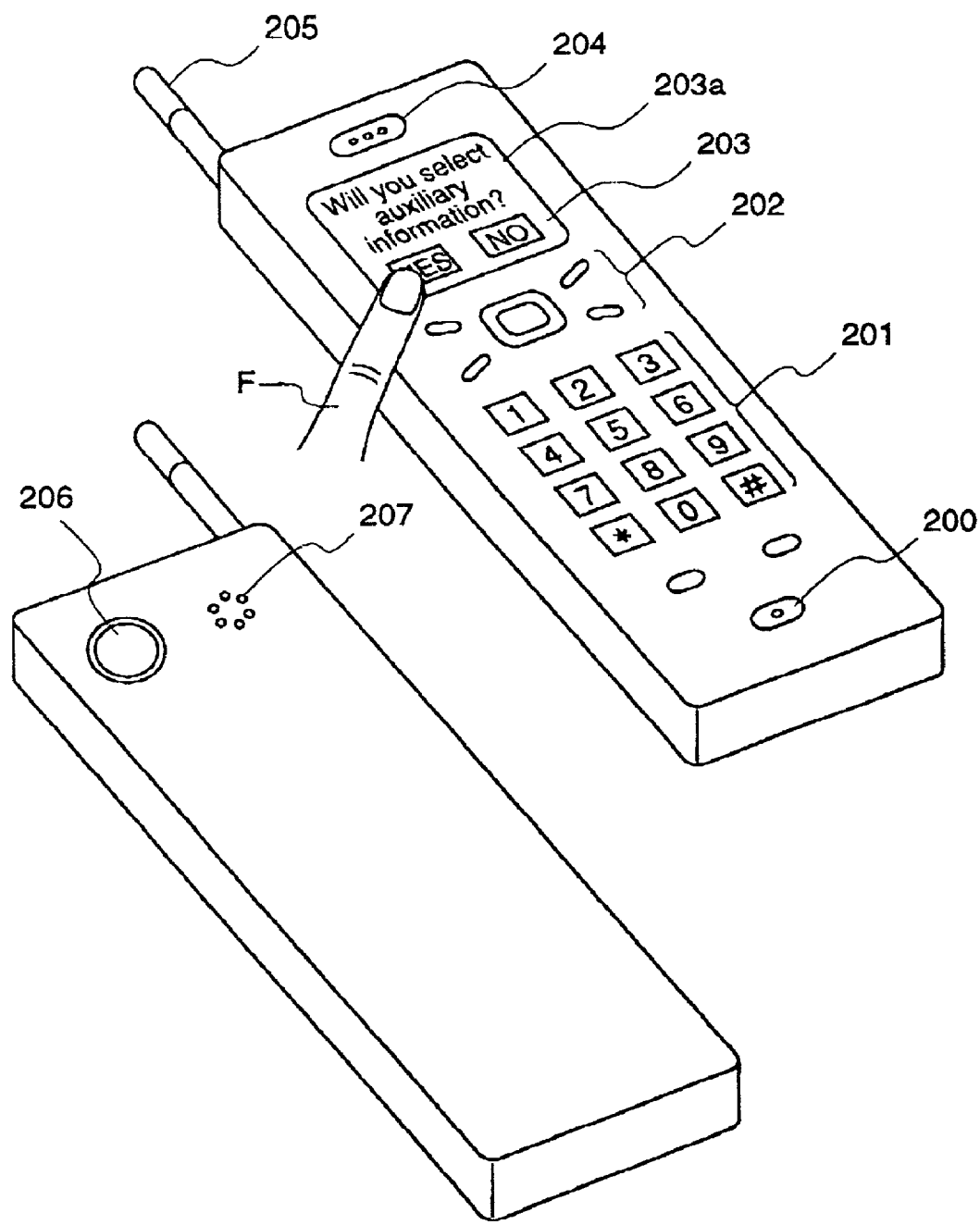
FIG. 40 is a diagram illustrating the state where the user puts a finger on the liquid crystal display of the handy phone according to the second embodiment.
Figure 41:
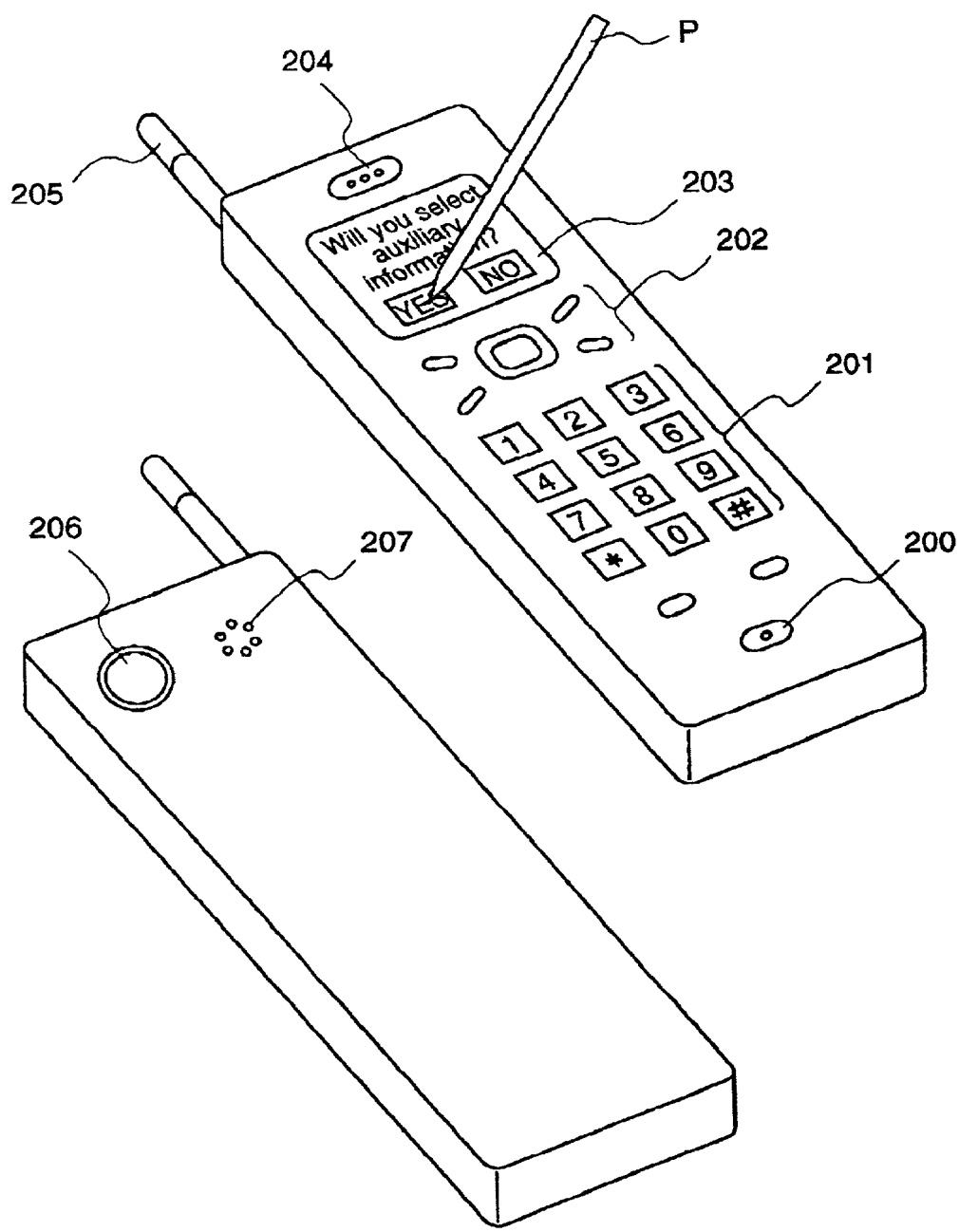
FIG. 41 is a diagram illustrating the state where the user applies a pen onto the liquid crystal display of the handy phone according to the second embodiment.
Figure 42:
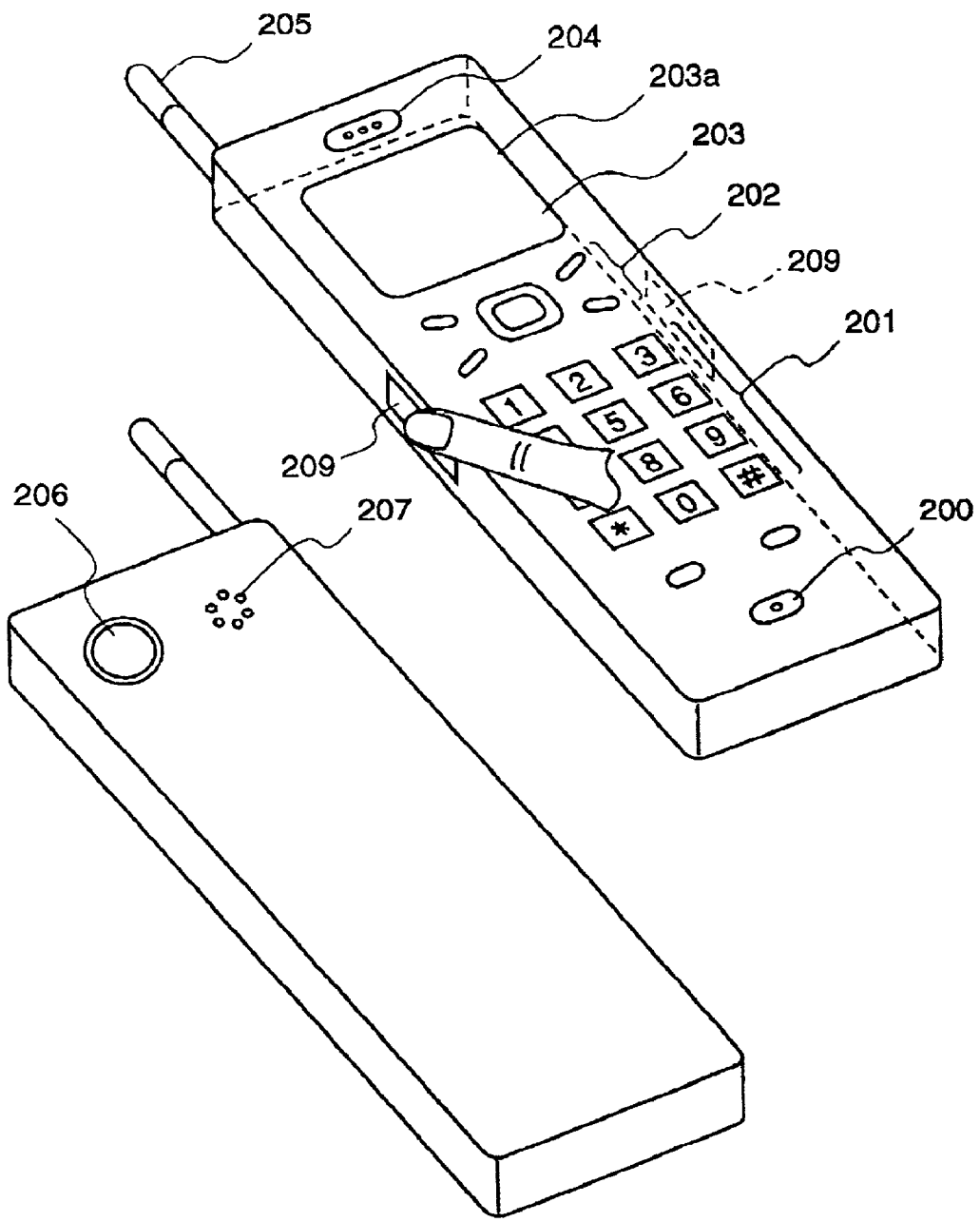
FIG. 42 is a diagram illustrating the state where the user puts a finger on an information switch which is provided on the handy phone according to the second embodiment.
Figure 43:
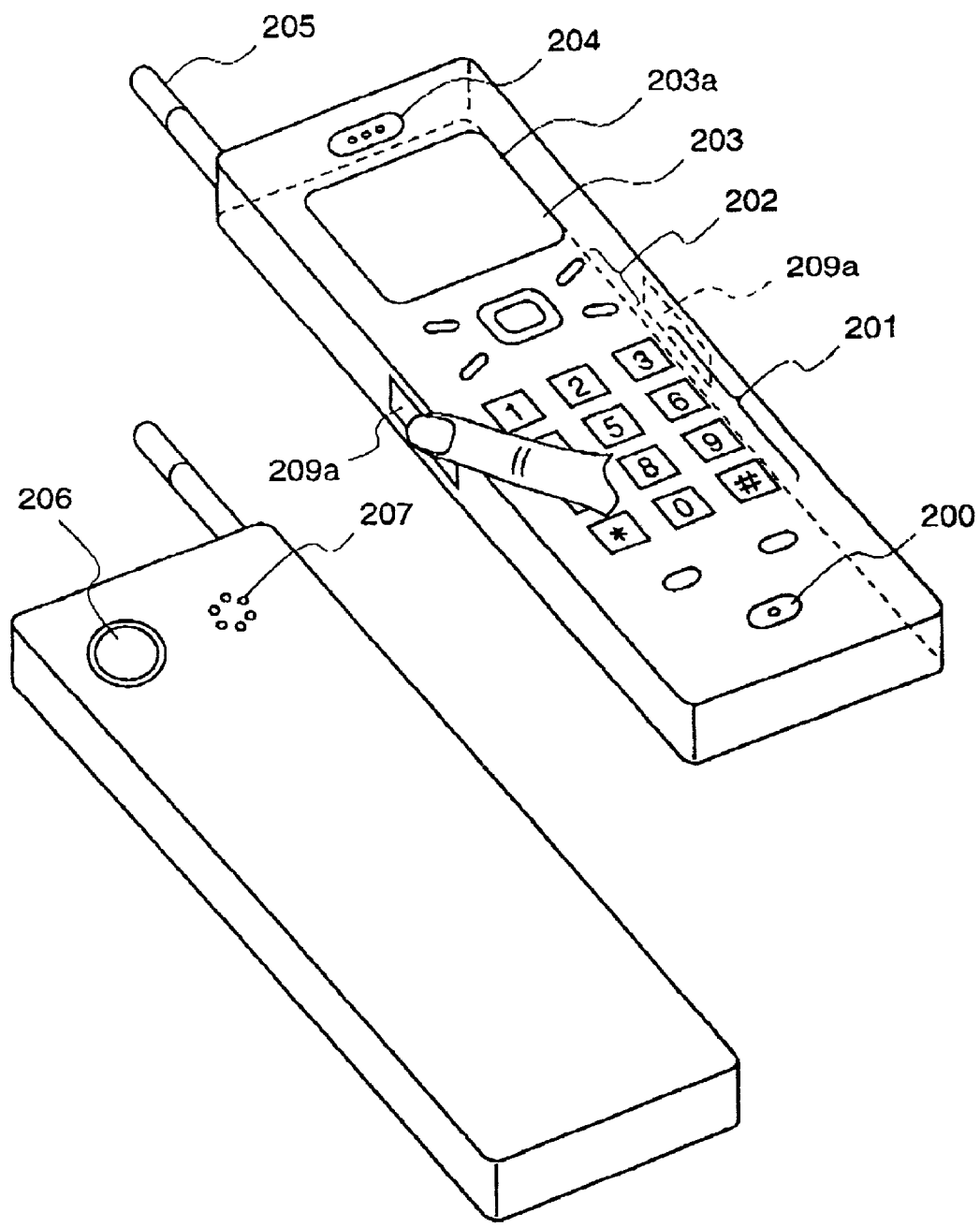
FIG. 43 is a diagram illustrating the state where the user puts a finger on a pressure sensor which is provided on the handy phone according to the second embodiment.
Figure 44:
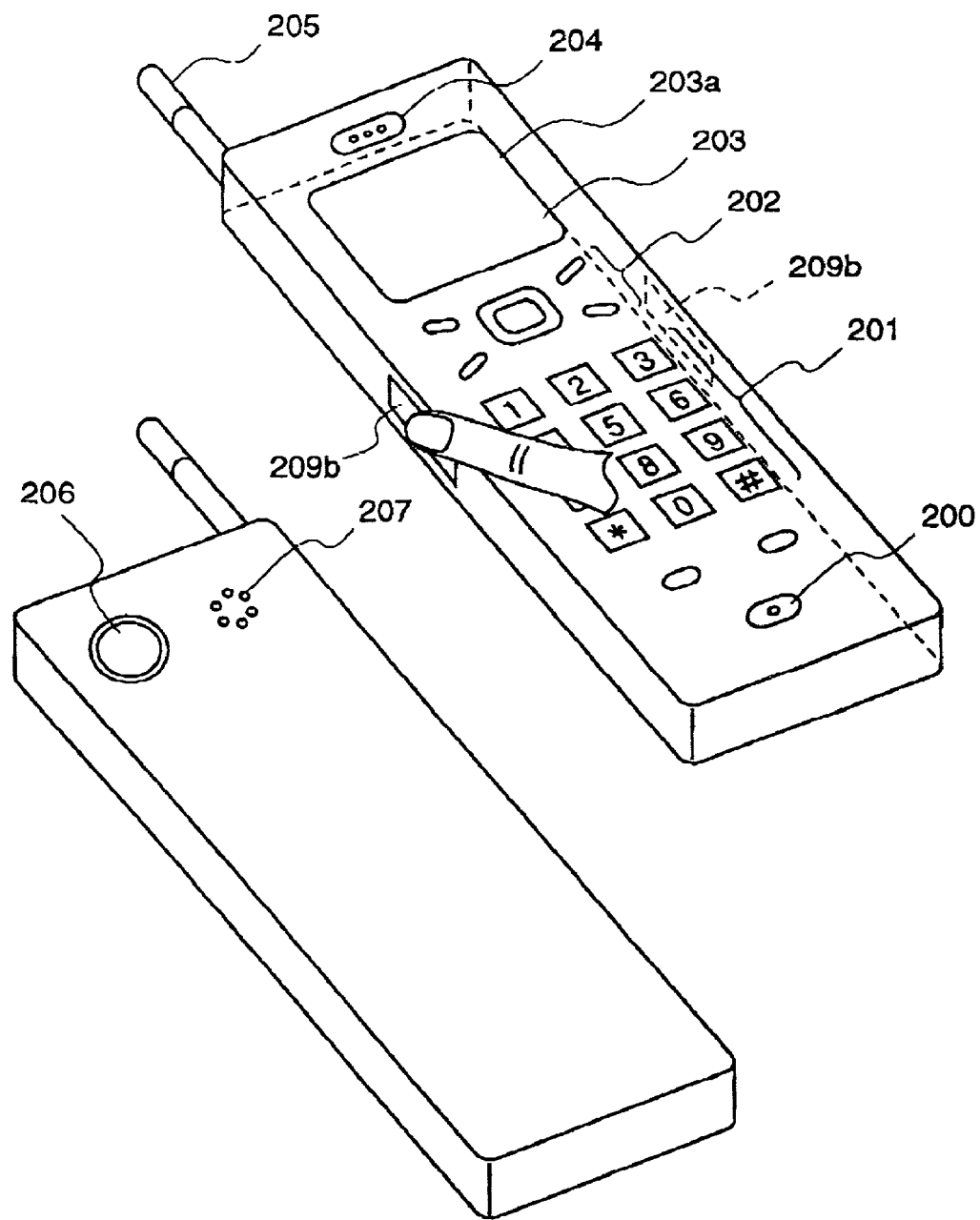
FIG. 44 is a diagram illustrating the state where the user puts a finger on a sweat sensor which is provided on the handy phone according to the second embodiment.
Figure 45:
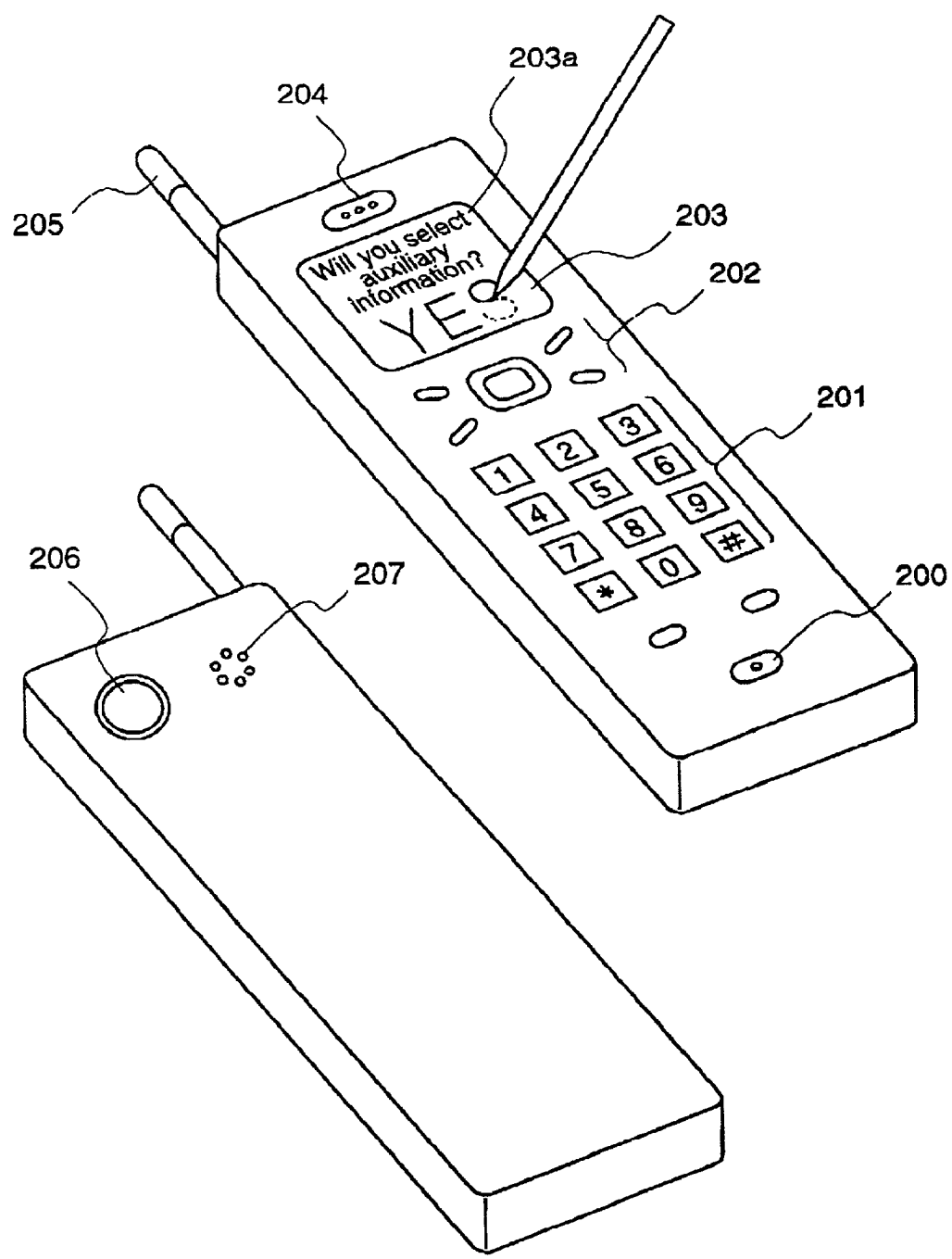
FIG. 45 is a diagram illustrating the state where the user applies a pen onto a touch panel which is provided on the liquid crystal display of the handy phone according to the second embodiment.
Figure 46:
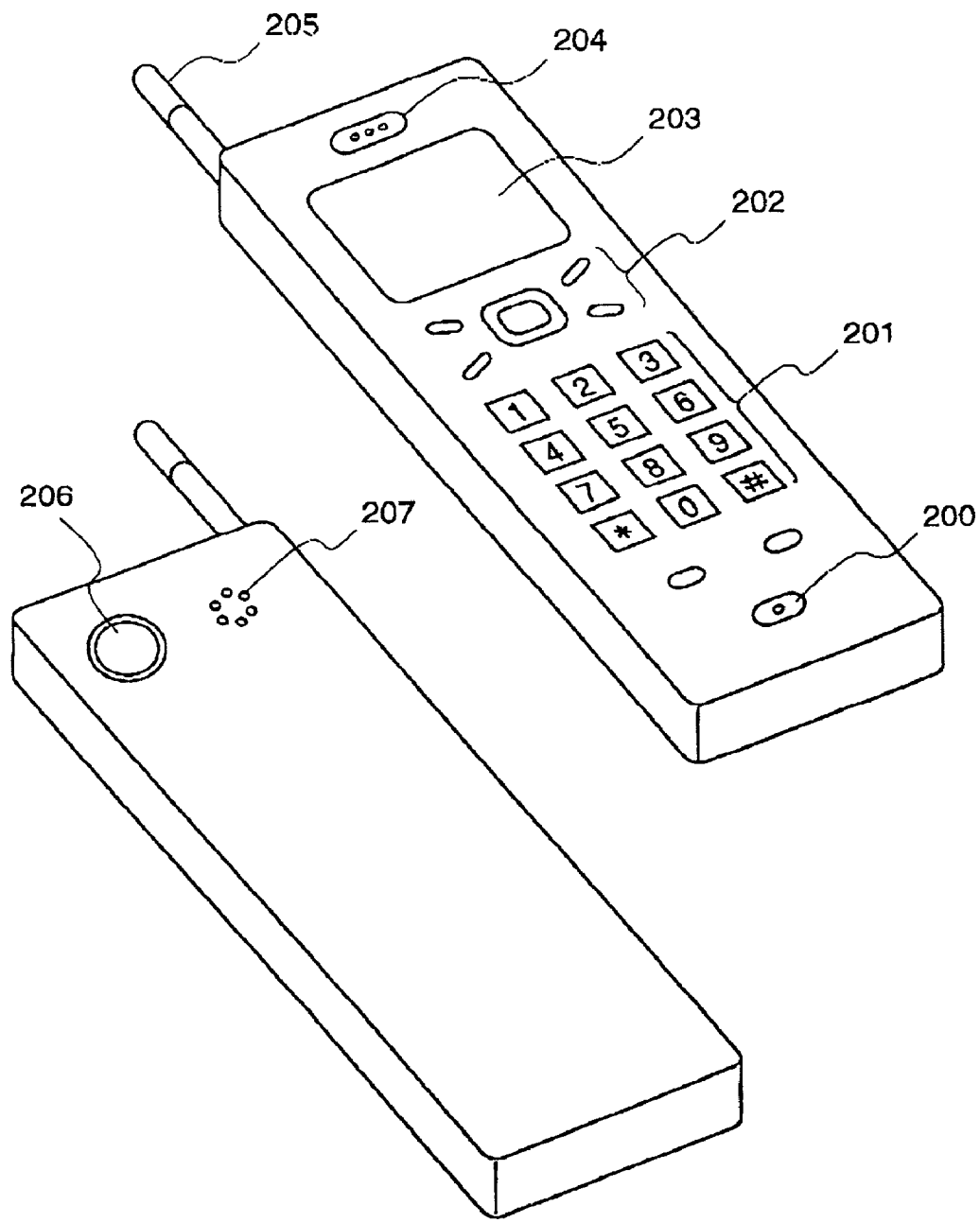
FIG. 46 is a diagram illustrating the state where a microphone provided on the back of the handy phone according to the second embodiment picks up a sound.

That is, also in the handy phone, it is possible to input auxiliary information by combination of operations of the recording switch, the power button, and the like which are assigned to the ten key 201 and the function key 202 operated in synchronization with the capturing operation of the user. At this time, a question is displayed on the liquid crystal display 203 as shown in FIG. 38, or answer buttons to the question are displayed on the touch panel 203a as shown in FIG. 39, and the user can select an answer to the question by applying the finger 4 or pen P onto a portion corresponding to a desired menu button displayed on the liquid crystal display 203 as shown in FIG. 40 or 41. Alternatively, it is possible to input auxiliary information by operating the information switch 209 provided on the body of the handy phone as shown in FIG. 42, or by sensing the user's hand holding the body with the pressure sensor 209a or the sweat sensor 209b shown in FIG. 43 or 44, or by direct hand-writing onto the touch panel of the liquid crystal display 203 as shown in FIG. 45, or by detecting the level of the cheers or the user's voice which is picked up by the conversation microphone 207. In this way, the user can easily input auxiliary information by inputting some parameters using any of the above-mentioned methods which are familiar to the ordinary users, without premising knowledge about MPEG-7 that cannot be expected from the ordinary users, and furthermore, the user can easily obtain index information (auxiliary information) when the captured moving picture is played back later.

As described above, according to the second embodiment of the present invention, in the handy phone, auxiliary information is input by inputting some parameters using a method that is familiar to the ordinary users, without premising knowledge of MPEG-7 that cannot be expected from the ordinary user. The method being, for example, a combination of: (1) operations of the recording switch, the power button, and the like which are assigned to the ten key 201 or the function key 202 operated in synchronization with the capturing operation of the user; (2) user operation of putting a finger or a pen onto a portion corresponding to a desired option button of a menu displayed on the touch panel of the liquid crystal display 203; (3) user operation on the information switch which is provided on the body of the handy phone; or (4) user operation of touching or hand-writing on the liquid crystal monitor. Therefore, the user can easily input auxiliary information, and obtain index information (auxiliary information) when the captured moving picture is played back later.

Also in this second embodiment, as in the first embodiment, whether auxiliary information should be selected or not may be selected by the user every time the user turns on the power button, or it may be set independently of turn-on of the power button.

Further, auxiliary information may be generated in synchronization with the capturing button. When the handy phone is set such that the power is turned off manually or automatically for long battery life, in order to cope with this setting, auxiliary information may be generated in synchronization with power on/off.

Further, as already described for the first embodiment, the descriptions of XML or the like are not limited to the above-described several kinds of parameters, and it is possible to select desired parameters from a menu according to the purpose. Further, although the second embodiment is described on the premise that a captured picture is transmitted, a captured picture is not necessarily transmitted, and it can be used also when compressed video and audio data are recorded as they are. Furthermore, although auxiliary information is generated at capturing, it is also possible to generate auxiliary information even at playback by using the information button at the time of playback, i.e., when playing a picture captured by the handy phone itself of this second embodiment to confirm the picture. When recording or transmitting the generated auxiliary information, it is decided, according to the construction of the device or system, as to whether the auxiliary information should be recorded/transmitted after being multiplexed in the captured video and audio data, or it should be stored in another place for recording/transmission so that the auxiliary information can be recorded/transmitted independently of the captured video and audio data.

Furthermore, it is also possible to detect a section in the video data corresponding to a degree of importance specified by the user, and reproduce only this section by the handy phone itself to be displayed on the liquid phase display. Therefore, the CPU can extract only data having a high degree of importance from the video data recorded on the recording medium, and reproduce the extracted data, whereby confirmation of the recorded data by the monitor can be carried out with efficiency. Further, the user can enjoy the recorded "work" without feeling tired, and the power consumption is reduced to secure more driving time.

Furthermore, it is possible to record a value of a viewpoint which has previously been determined, by using the information button. When the ten key is used for inputting the value of the viewpoint, it should be instructed in advance with the function key or the like.

Embodiment 3

Figure 47:
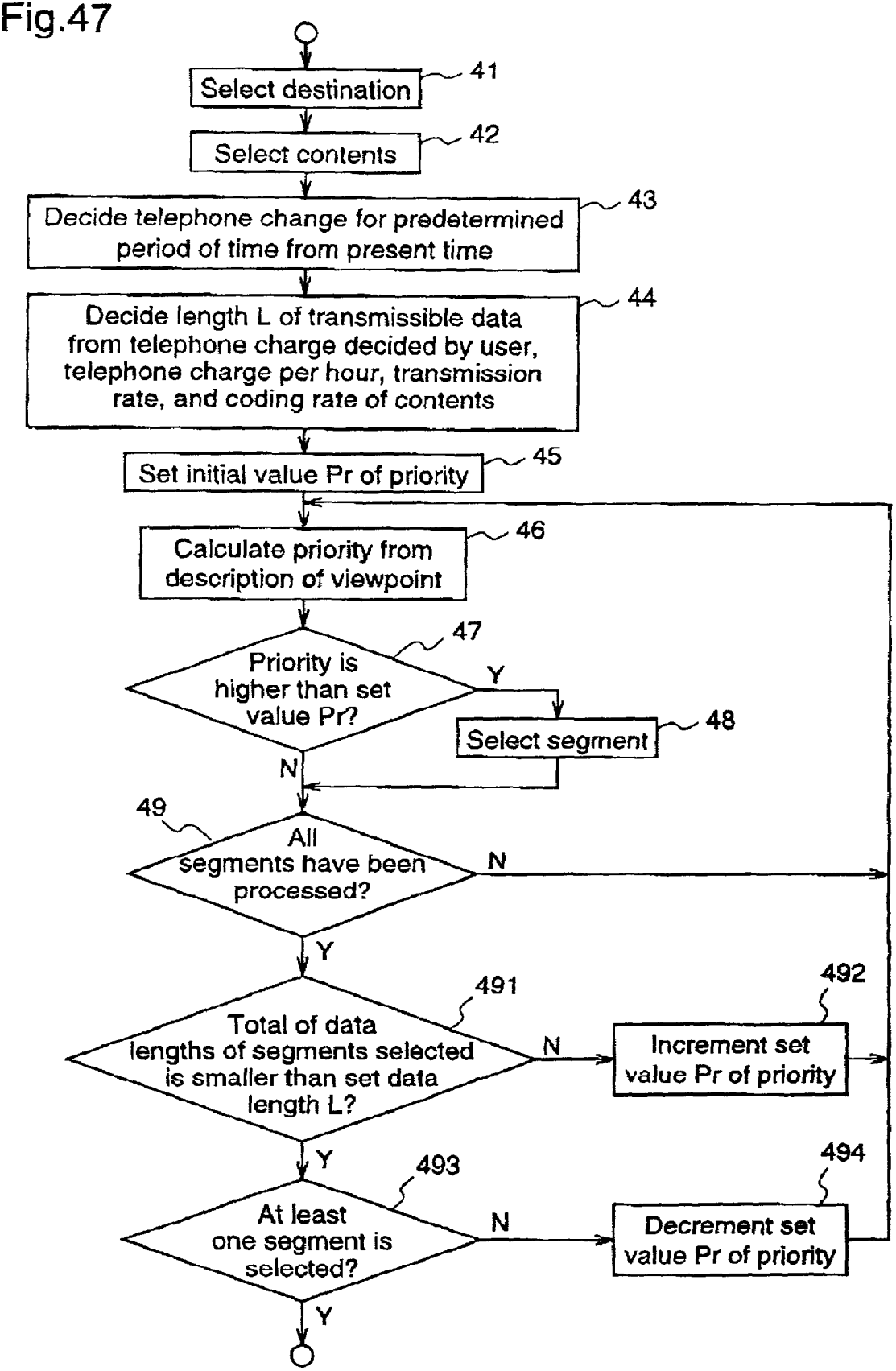
FIG. 47 is a flowchart for explaining a picture data generation method according to third embodiment of the present invention.

FIG. 47 is a flowchart for explaining an example of an image data generation method according to a third embodiment of the present invention. It is assumed that the flowchart shown in FIG. 47 is executed by a control CPU which is embedded in a handy phone or the like.

FIG. 47 shows an example of a method for extracting (moving) video and audio data to be transmitted so that video and audio data as much as possible can be transmitted at a telephone charge lower than specified, when video and audio data to which auxiliary information generated by the auxiliary information generator according to the second embodiment is attached, is transmitted by a handy phone or the like.

In FIG. 47, a destination and contents to be transmitted are selected in steps 41 and 42. Thereafter, a telephone charge is set in step 43, and a length L of contents which can be transmitted at the set telephone charge is calculated in step 44. Since video and audio contents are usually data-compressed, the length L corresponds to the length of the compressed data. However, the real time of video and audio can be easily obtained by converting the length L to the data size before compression. The video and audio data is divided into sub-sections called "segments" according to the auxiliary information. Then, an initial value Pr of priority is set in step 45, and a priority of a target segment is calculated in step 46. Thereafter, in step 47, the calculated priority is compared with the initial value Pr by utilizing priority information which is included in the auxiliary information for each segment. For example, in FIG. 3, in a description of PointOfView (viewpoint description), a value where ViewPoint="exciting" is extracted and compared with the Pr. Although in this example the priority is calculated from the value of one description, when there is a plurality of descriptions of priority values, the corresponding priorities are derived by using a predetermined conversion expression, and a representative priority is determined and, thereafter, the representative priority is compared with the Pr. When the derived priority of the target segment is larger than the set value Pr, this segment is selected in step 48. When it is judged that the above-mentioned steps have been completed (step 49) and that the length of the selected segment is shorter than the set data length L (step 491), it is confirmed that at least one segment is selected (step 493) to end the process.

On the other hand, when it is judged in step 491 that the total of the lengths of the selected segments is longer than the data length L, the priority set value Pr is incremented in step 492, and the same operation as mentioned above is repeated. For example, in the case where the total of the lengths of the segments, which are selected when the priority set value Pr is "0.5", is longer than the data length L which can be transmitted at the predetermined telephone charge, an increment "0.1" is added to the priority set value Pr to make it "0.6", whereby the number of segments to be selected is reduced. This operation is repeated until the total of the segment lengths falls within the data length L which can be transmitted at the predetermined telephone charge. In this way, the priority set value Pr is increased in predetermined increments such as "0.1", and a priority set value Pr, at which the total of the segment lengths becomes lower than the data length L, is detected. Thereby, the total of the segment lengths falls within the predetermined data length L, and only the data having a high degree of importance can be collected.

Since the above-mentioned processes are carried out using the auxiliary information, the video and audio data are not directly handled. Therefore, the processing load falls within a sufficiently allowable range.

As described above, in the third embodiment of the invention, according to an upper limit of a telephone charge that is set by the user, an allowable calling time is determined within this charge. Then, a priority level is set, and the priority level is varied so that the total of segments whose priorities are higher than the set priority, approaches, as close as possible, a time whose upper limit is the calling time. Therefore, only important segments, i.e., important video and audio data, can be selected as many as possible within the range of the predetermined telephone charge, and these segments can be input.

Embodiment 4

Figure 48:
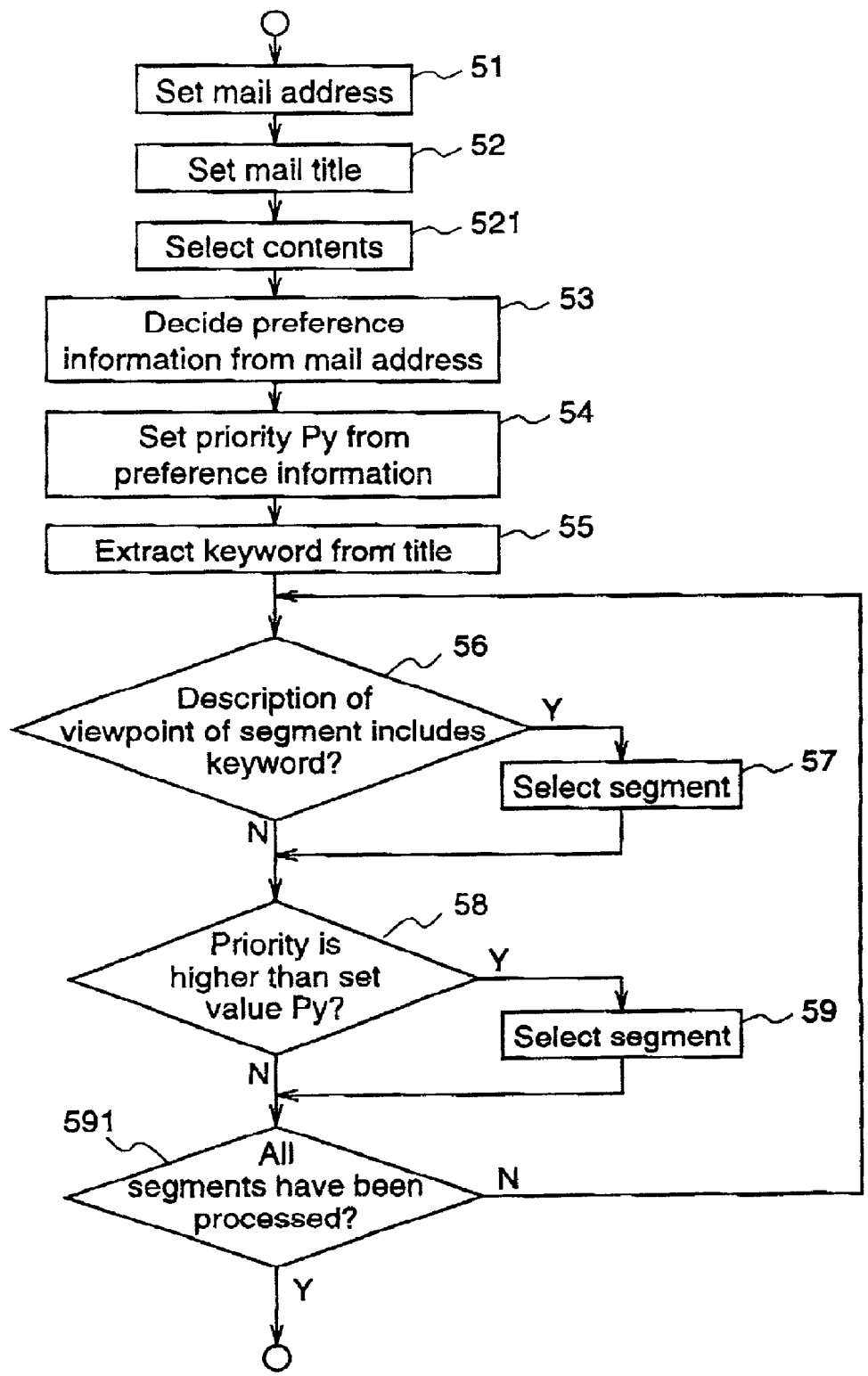
FIG. 48 is a flowchart for explaining a picture data generation method according to the third embodiment of the present invention.

FIG. 48 is a flowchart for explaining an example of a video data generation method according to a fourth embodiment of the present invention. It is assumed that the flowchart shown in FIG. 48 is executed by a control CPU which is embedded in a handy phone or the like.

FIG. 48 shows a video data generation method based on the premise that generated video data is attached to a mail. Initially, a mail address and a title are set in step 51 and 52, respectively. Thereafter, in step 53, information relating to the preference of a person to which the mail is directed (for example, a description of UserPreference in MPEG-7), which information is stored in the handy phone, is extracted from the data base according to the mail address, and a priority Py is set in step 54. Simultaneously, a keyword is extracted from the title in step 55. Next, in steps 56, 57, 58, and 59, a segment whose priority is higher than the Py or a segment including a keyword in the description of ViewPoint or the title of VideoSegment is selected from the selected contents. When, in step 591, it is judged that all of the segments have been subjected to the checks in steps 56 and 58, only a part relating to the title or the preference of the receiver of the mail is attached to the mail to be transmitted.

As described above, according to the fourth embodiment, the taste or preference of the receiver is decided according to the mail address of the receiver, and a degree of importance is decided from the taste or preference, and segments whose degrees of importance are higher than the decided degree of importance are collected to be transmitted to the receiver. Therefore, only an important part of the contents can be transmitted, whereby the telephone charge can be reduced at both the transmitter and the receiver.

While in FIG. 48 segments to be transmitted are selected according to the address and the title, segments to be transmitted may be selected from the keyword in the contents of the mail document, or the frequency of occurrence of the keyword. Further, although in FIG. 48 the data length is not limited, when FIG. 48 is combined with FIG. 40, further reduction in telephone charge can be achieved.

While in the third and fourth embodiments segments in contents are selected, the present invention is not restricted thereto. The present invention is also applicable to the case where desired contents are selected from a plurality of contents or from all of already-recorded contents.

Furthermore, although the priority of each segment is calculated using the degree of importance or preference, the present invention is not restricted thereto. For example, information about the capability of the terminal at destination or other information such as length, title, and the like can also be used by converting it into the priority.

Furthermore, although the user stores the preferences of mail receivers in the database in the handy phone, when such database exists on the network, the user need not have the database but can access the external database as necessary.

Furthermore, it is possible to constitute a database by attaching data of your preference or data of the capability of a terminal at your end to a mail when transmitting the mail.

Furthermore, while the third and fourth embodiments are described for the case where video and audio data are transmitted, the present invention is also applicable to the case where video and audio data having a predetermined length are recorded on a recording medium.

Figure 49:
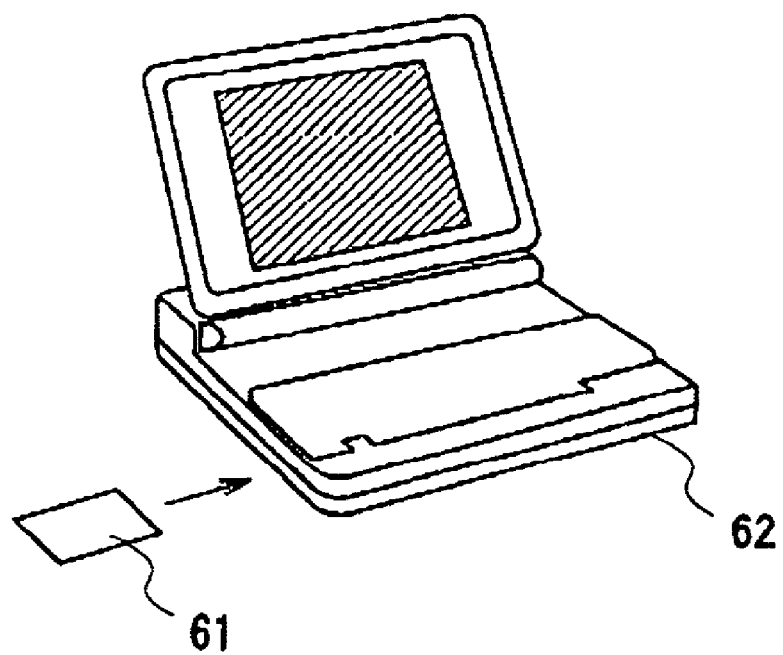
FIG. 49 is a diagram for explaining a recording medium on which a program and data for making a computer perform any of the aforementioned embodiments are recorded, and a computer system.

Furthermore, the auxiliary information generation apparatus according to any of the first to fourth embodiments can be implemented by a computer as shown in FIG. 49. FIG. 49 is a diagram illustrating a recording medium 61 on which computer program and data are recorded, and a computer system 62. It is assumed that the recording medium 61 is a semiconductor memory card. The procedure shown in FIG. 2, 47, or 48 is implemented by a program, and the program is recorded on the recording medium 61, whereby the program can be ported to the computer system 62 to be executed. Further, the same effects as those achieved by the aforementioned embodiments can be obtained by writing and reading the data itself in/from the recording medium.

While in the aforementioned embodiments a video tape and a semiconductor memory are used as data recoding media, a floppy disk or an optical disk such as CD-R, CD-RW, MO, MD, or DVD may be employed as long as it has a sufficient capacity.

Furthermore, while in the first and second embodiments a combined camera and digital VTR is taken as an example, a portable VTR or stationary VTR having a separated camera may be employed.

Moreover, while in the third and fourth embodiments a handy phone with a camera function is taken as an example, a PDA (Persona Digital Assistants) or a portable game machine may be employed as long as it is provided with a camera function or a camera can be connected to it.

What is claimed is:

1. An imaging device for adding auxiliary information to digital data, said imaging device comprising:
    an interface device operable to receive an externally generated image input
    an information button operable to input auxiliary information indicating a degree of importance of digital data, according to user operation;

an imaging unit operable to capture and photoelectrically convert an image into an image signal when said interface device receives the externally generated image input;

a coding device operable to generate first digital data by compressing the image signal created by said imaging unit when said interface device receives the externally generated image input;

a selection unit operable to select an instruction of how to record the auxiliary information for (i) an important scene, (ii) a change of shooting location, and (iii) a predetermined time; and a digital data generation device operable to combine, at a time when the auxiliary information is input and the image is captured and photoelectrically converted into the image signal by said imaging unit, the auxiliary information received at the time with the first digital data corresponding to the image captured and photoelectrically converted by said imaging unit at the time, according to the instruction selected by the selection unit, to produce second digital data comprising the combined auxiliary information and first digital data, and output the second digital data to a recording device or a transmission device.

2. The imaging device of claim 1, wherein said interface device includes an identifier input part operable to identify the first digital data, and wherein the auxiliary information identifies the first digital data according to said identifier input part.

3. The imaging device of claim 1, wherein said interface device includes a microphone operable to receive audio, and wherein the auxiliary information indicates a level of audio received by said microphone.

4. The imaging device of claim 1, wherein said digital data generation device is operable to insert the auxiliary information into a header portion of the first digital data, and operable to generate the second digital data comprised of the first digital data and the auxiliary information inserted into the header portion of the first digital data.

5. The imaging device of claim 1, wherein said imaging device is integrated into a camera.

6. The imaging device of claim 1, wherein the imaging device is integrated into a mobile phone.

7. The imaging device according to claim 1, wherein, if the degree of importance is identified as higher than normal, then an image representing the second digital data is assigned a specific color, and if the degree of importance is identified as lower than normal, then the image representing the second digital data is assigned another specific color.

8. An imaging method for adding auxiliary information to digital data, said imaging method comprising:

receiving an externally generated image input;

receiving an auxiliary information input indicating a degree of importance of digital data, via an information button according to user operation;

capturing and photoelectrically converting an image into an image signal upon said receiving of the externally generated image input;

generating first digital data by compressing the image signal created by said capturing and photoelectrically converting of the image upon said receiving of the externally generated image input;

selecting an instruction of how to record the auxiliary information for (i) an important scene, (ii) a change of shooting location, and (iii) a predetermined time;

combining, at a time of said receiving of the auxiliary information and of said capturing and photoelectrically converting the image into the image signal, the auxiliary information received at the time with the first digital data corresponding to the image captured and photoelectrically converted, at the time, by said capturing and photoelectrically converting, according to the selected instruction, to produce second digital data comprising the combined auxiliary information and first digital data; and outputting the second digital data to a recording device or a transmission device.

9. A computer readable recording medium storing a program for causing a computer to execute an imaging method for adding auxiliary information to digital data, said imaging method comprising:

receiving an externally generated image input;

receiving an auxiliary information input indicating a degree of importance of digital data, via an information button according to user operation;

capturing and photoelectrically converting an image into an image signal upon said receiving of the externally generated image input;

generating first digital data by compressing the image signal created by said capturing and photoelectrically converting of the image upon said receiving of the externally generated image input;

selecting an instruction of how to record the auxiliary information for (i) an important scene, (ii) a change of shooting location, and (iii) a predetermined time;

combining, at a time of said receiving of the auxiliary information and of said capturing and photoelectrically converting the image into the image signal, the auxiliary information received at the time with the first digital data corresponding to the image captured and photoelectrically converted, at the time, by said capturing and photoelectrically converting, according to the selected instruction, to produce second digital data comprising the combined auxiliary information and first digital data; and outputting the second digital data to a recording device or a transmission device.

* * * * *